United States Patent
Fiske

(10) Patent No.: US 8,010,467 B2
(45) Date of Patent: Aug. 30, 2011

(54) ACTIVE ELEMENT MACHINE COMPUTATION

(75) Inventor: Michael Stephen Fiske, San Francisco, CA (US)

(73) Assignee: Fiske Software LLC, San Francisco, CA (US)

( * ) Notice: Subject to any disclaimer, the term of this patent is extended or adjusted under 35 U.S.C. 154(b) by 1518 days.

(21) Appl. No.: 11/178,665

(22) Filed: Jul. 11, 2005

(65) Prior Publication Data
US 2007/0079108 A1 Apr. 5, 2007

Related U.S. Application Data

(63) Continuation-in-part of application No. 10/791,249, filed on Mar. 2, 2004, now Pat. No. 7,398,260.

(60) Provisional application No. 60/456,715, filed on Mar. 24, 2003.

(51) Int. Cl.
*G06E 1/00* (2006.01)
*G06E 3/00* (2006.01)
*G06F 15/18* (2006.01)
*G06G 7/00* (2006.01)
*G06N 3/02* (2006.01)
*G06F 15/16* (2006.01)

(52) U.S. Cl. .............................. 706/15; 706/14; 709/202
(58) Field of Classification Search .................... 706/10, 706/14–44; 709/202, 206
See application file for complete search history.

(56) References Cited

U.S. PATENT DOCUMENTS

| | | | |
|---|---|---|---|
| 3,950,733 A * | 4/1976 | Cooper et al. ................. 706/26 |
| 4,660,166 A | 4/1987 | Hopfield | |
| 4,734,856 A | 3/1988 | Davis | |
| 4,962,342 A | 10/1990 | Mead | |
| 5,155,802 A | 10/1992 | Mueller | |
| 5,216,752 A * | 6/1993 | Tam ................................ 706/17 |
| 5,325,464 A | 6/1994 | Pechanek | |
| 5,369,731 A | 11/1994 | Masumoto | |
| 5,422,983 A | 6/1995 | Castelaz | |
| 5,524,175 A | 6/1996 | Sato | |
| 5,524,176 A | 6/1996 | Narita | |
| 5,619,618 A | 4/1997 | Bigus | |
| 5,787,300 A | 7/1998 | Wijaya | |
| 5,832,466 A | 11/1998 | Feldgajer | |
| 5,867,397 A | 2/1999 | Koza | |
| 6,049,793 A | 4/2000 | Tomita | |
| 6,256,619 B1 | 7/2001 | Grichnik | |
| 6,332,137 B1 | 12/2001 | Hori | |

(Continued)

FOREIGN PATENT DOCUMENTS

WO WO/2007/075156 A2 7/2007

OTHER PUBLICATIONS

Gurney, K. "An Introduction to Neural Networks" CRC Press. 1997.*

(Continued)

*Primary Examiner* — Jeffrey A Gaffin
*Assistant Examiner* — Benjamin Buss
(74) *Attorney, Agent, or Firm* — David Lewis

(57) ABSTRACT

An active element machine is a new kind of computing machine. When implemented in hardware, the Active element machine can execute multiple instructions simultaneously, because every one of its computing elements is active. This greatly enhances the computing speed. By executing a meta program whose instructions change the connections in a dynamic Active element machine, the Active element machine can perform tasks that digital computers are unable to compute.

49 Claims, 16 Drawing Sheets

U.S. PATENT DOCUMENTS

| | | | |
|---|---|---|---|
| 6,470,261 | B1 | 10/2002 | Ng et al. |
| 6,601,053 | B1 | 7/2003 | Schaffer et al. |
| 6,678,548 | B1 * | 1/2004 | Echauz et al. ............... 600/544 |
| 6,751,601 | B2 | 6/2004 | Zegers |
| 6,754,645 | B2 | 6/2004 | Shi |
| 7,249,116 | B2 | 7/2007 | Fiske |
| 7,398,260 | B2 | 7/2008 | Fiske |
| 7,657,033 | B2 | 2/2010 | Fiske |
| 2002/0038294 | A1 * | 3/2002 | Matsugu ........................ 706/20 |
| 2003/0212645 | A1 | 11/2003 | Schaffer et al. |
| 2004/0128004 | A1 | 7/2004 | Adams |
| 2005/0081016 | A1 | 4/2005 | Sakai et al. |
| 2005/0103351 | A1 | 5/2005 | Stomberg et al. |
| 2006/0236226 | A1 | 10/2006 | Meijer et al. |
| 2006/0245225 | A1 | 11/2006 | Vorbach |
| 2006/0259894 | A1 | 11/2006 | Fiske |
| 2006/0277533 | A1 | 12/2006 | Fiske |
| 2007/0079108 | A1 | 4/2007 | Fiske |
| 2007/0288668 | A1 | 12/2007 | Fiske |

OTHER PUBLICATIONS

Reyneri, L.M. "Theoretical and Implementation Aspects of Pulse Streams: an Overview" 1999.*

Murray, A.F. et al. "Pulse-Stream VLSI Neural Networks Mixing Analog and Digital Techniques" IEEE Transactions on Neural Networks, vol. 2, No. 2, Mar. 1991.*

El-Masry, E.I. "Implementations of Artificial Neural Networks Using Current-Mode Pulse Width Modulation Technique" IEEE Transactions on Neural Networks, vol. 8, No. 3, May 1997.*

Kanamaru, T. et al. "Stochastic resonance in a pulse neural network with a propagational time delay" BioSystems 58. pp. 101-107. 2000.*

Horio "An asynchronous spiking chaotic neuron integrated circuit" Neurocomputing 64, pp. 447-472. 2005.*

Hugo de Garis et al., The Cam-Brain Machine (CBM): an FPGA-Based Hardware Tool that Evolves a 1000 Neuron-Net Circuit Module in Seconds and Updates a 75 Million Neuron Artificial Brain for Real-Time Robot Control, 2002, Neural Computing.

Ioana Domnica Marian, A Computational Biologically Inspired Model of Motor Control of Direction, 2002, MS Thesis, University College, Dublin Ireland, Abstract, Acknowledgements, pp. v-xi.

Masayasu Atsumi, Artificial Neural Development for Pulsed Neural Network Design—A Simulation Experiment on Animal's Cognitive Map Genesis 2002, Combinations of Evolutionary Computation and Neural Networks, IEEE, pp. 188-189.

John C. Gallagher et al., Continuous Time Recurrent Neural Networks: A Paradigm for Evolvable Analog Controller Circuits, 2002, IEEE.

Dario Floreano et al., Evolution of Spiking Neural Controllers for Autonomous Vision-Based Robots, 2001, Springer-Verlag Berlin Heidelberg, pp. 38-61, T. Gomi (Ed.): ER, LNCS 2217.

Farooq Azam, Biologically Inspired Modular Neural Networks, May 2000, PhD Dissertation, Virginia Polytechnic Institute.

Hays T. Siegelmann et al., Neural Networks and Analog Computation Beyond the Turing Limit, pp. 29-33, 153-164, Birkhauser, 1999.

Laurent Herault, Optimization by Pulsed Recursive Neural Networks1995, IEEE, pp. 1678-1683.

Kristian Lindgren et al., Regular Language Inference Using Evolving Neural Networks,1992, IEEE.

John G. Elias, Genetic Generation of Connection Patterns for a Dynamic Artificial Neural Network Proceedings of the Combinations of Genetic Algorithms and Neural Networks Workshop, 1992, IEEE.

Dipankar Dasgupta et al., Designing Application-Specific Neural Networks Using the Structured Genetic Algorithm, Jun. 6, 1992, In Proceedings of COGANN-92, IEEE Computer Society Press, USA.

J. David Schaffer et al., Combinations of Genetic Algorithms and Neural Networks: A Survey of the State of the Art1992, IEEE.

Carver Mead, Analog VLSI and Neural Systems,1989, pp. 36.39, 67-81, 208-209, 260-263, Addison-Wesley, United States.

Wilfrid Rall, Theoretical Significance of Dendritic Trees for Neuronal Input-Output Relations (1964), in Neural Theory and Modeling, ed., R. F. Reiss, 1964, pp. 122-145, Stanford University Press.

H.J. Bremermann, Optimization Through Evolution and Recombination, Self Organizing Systems, 1962, pp. 93-106, Spartan Books, Washington D.C.

W.W. Bledsoe, The Use of Biological Concepts in the Analytical Study of Systems,ORSA—TIMS National Meeting, 1961, pp. 1-25, Panoramic Research Incorporated, San Francisco, CA, USA.

George J. Friedman, Digital Simulation of an Evolutionary Process, 1959, pp. 171-184, vol. 4 of General Systems Yearbook.

George E.P. Box, Evolutionary Operation: A Method for Increasing Industrial Production, Applied Statistics, 1957, pp. 81-101, vol. 6, No. 2, Royal Statistical Society, England.

Alan Turing, on Computable Numbers with an Application to the Entscheidungsproblem, Proceedings London Mathematical Society, 1936, pp. 230-265, vol. 42, pp. 544-546, vol. 93, England.

Ioana Domnica Marian, A Computational Biologically Inspired Model of Motor Control of Direction, 2002, MS Thesis, University College, Dublin Ireland, Abstract, Acknowledgements, 209 pages.

* cited by examiner t=0
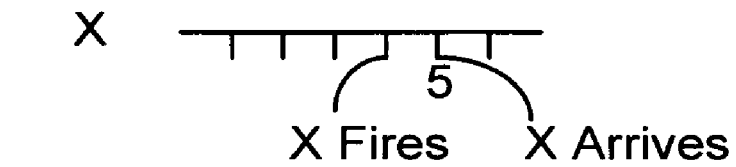
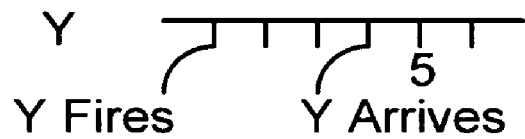
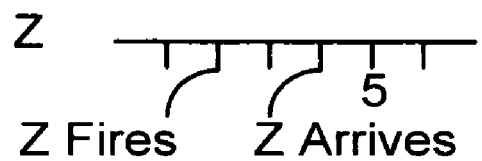
FIG. 1B

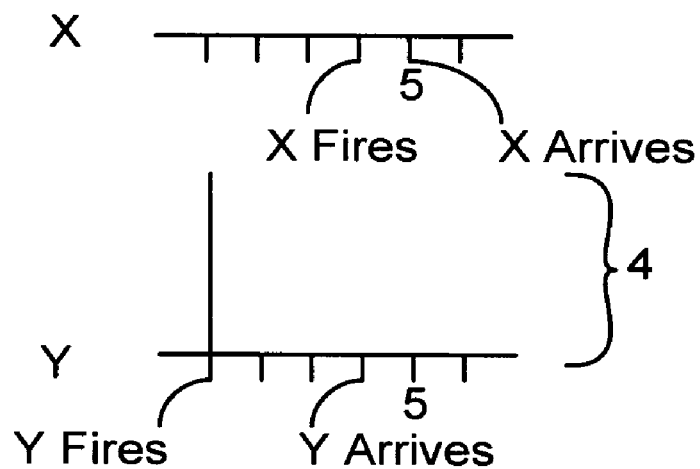
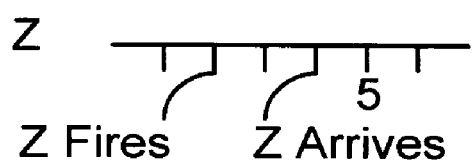
FIG. 1C

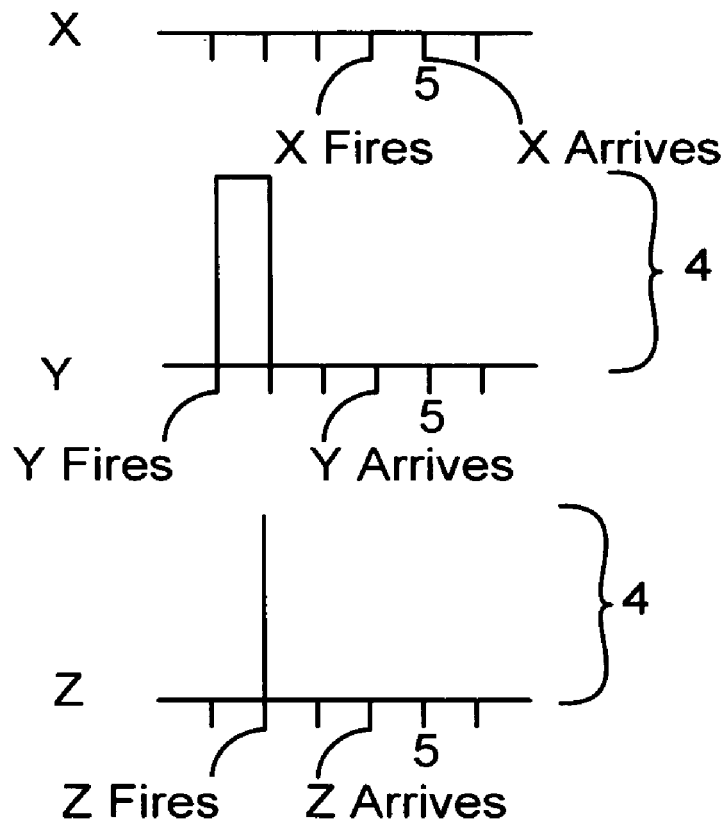
FIG. 1D

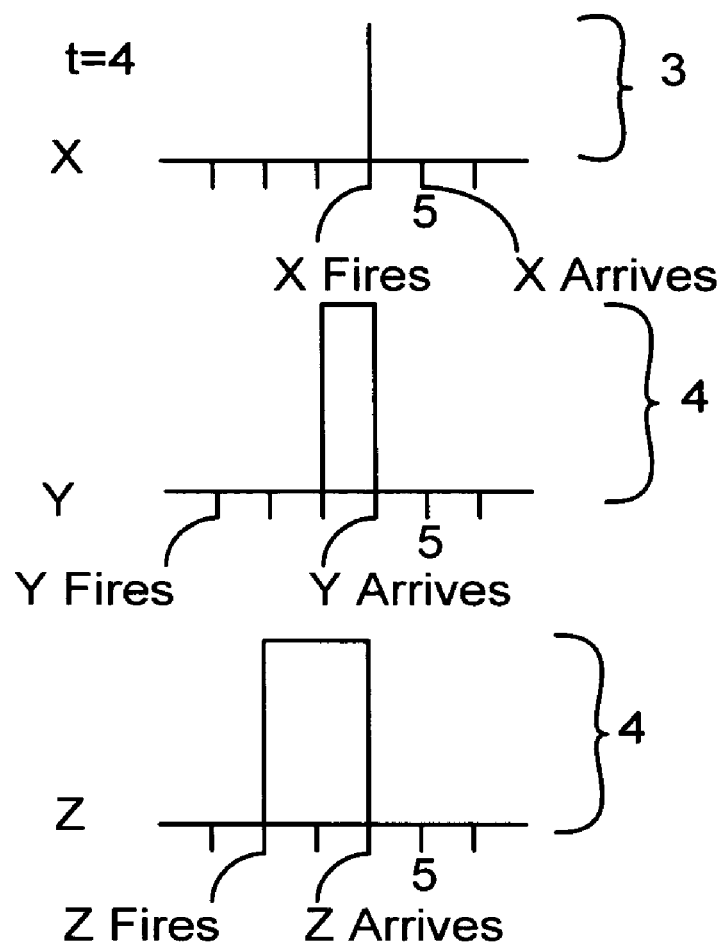
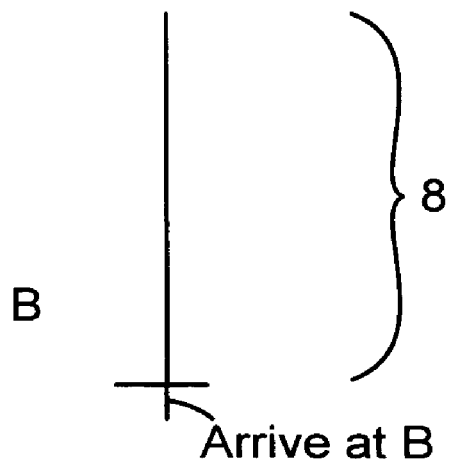
FIG. 1F

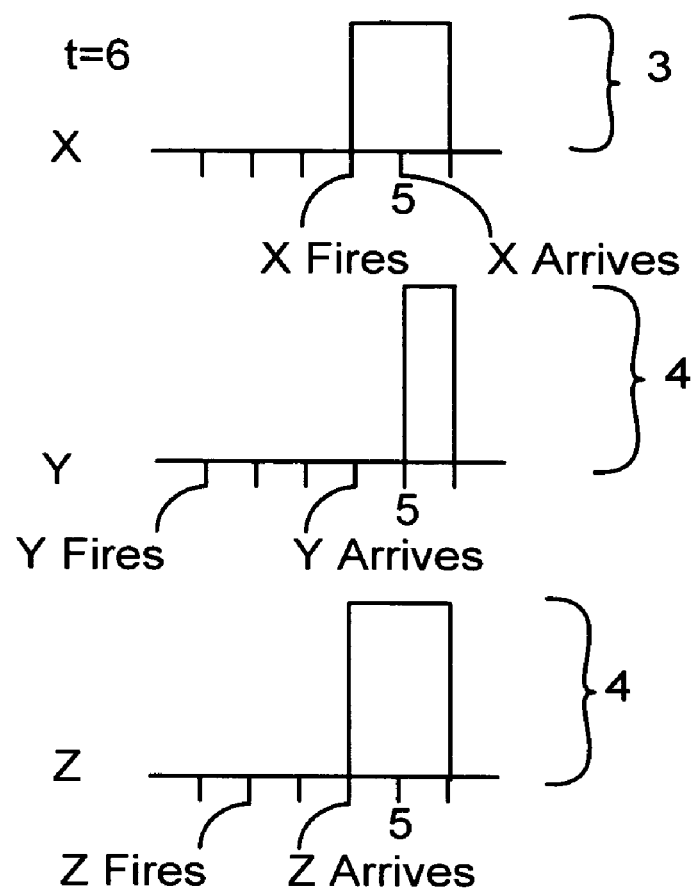
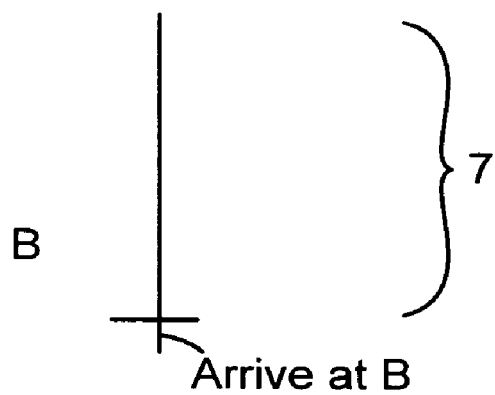
FIG. 1H

FIG. 2
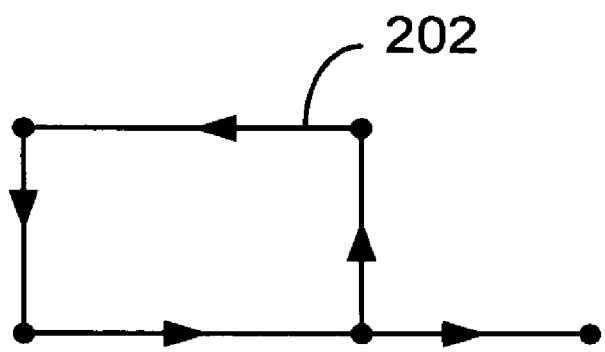
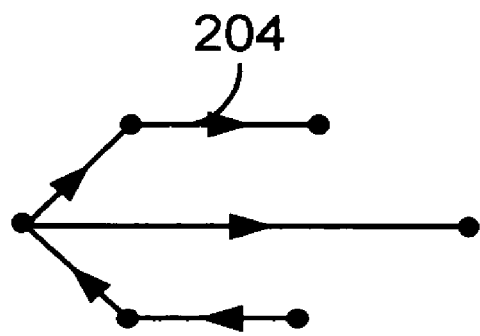

Machine Structure used in Cyclic Graph Evolution

Internal Modules are labeled: $m_1, m_2, m_3, \ldots m_k$

FIG. 4    CGE Crossover
Before Crossover
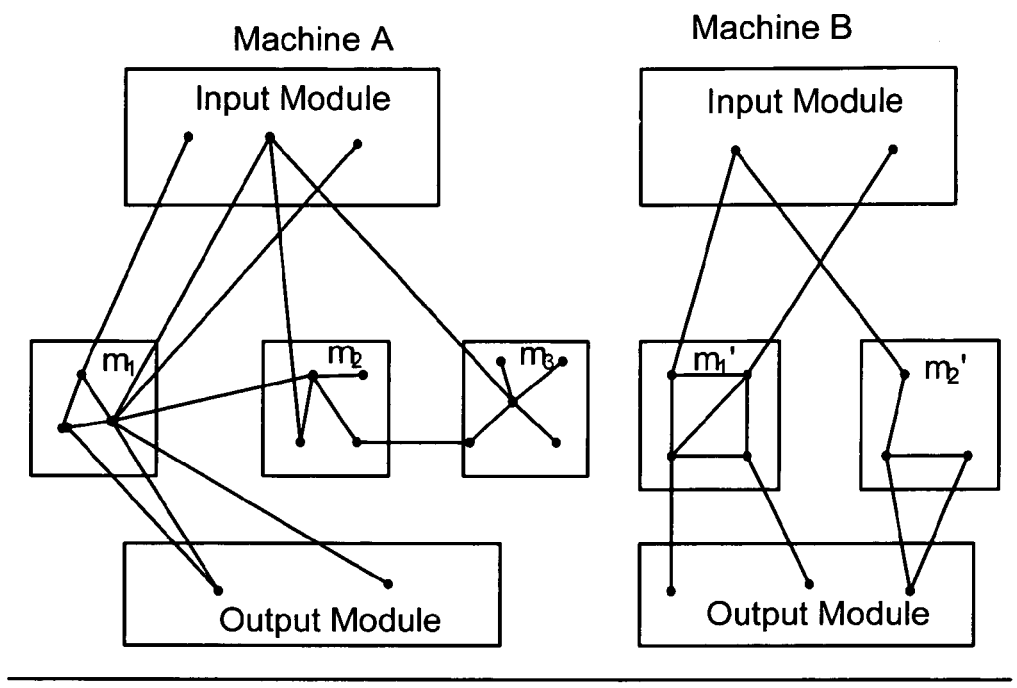
After Crossover
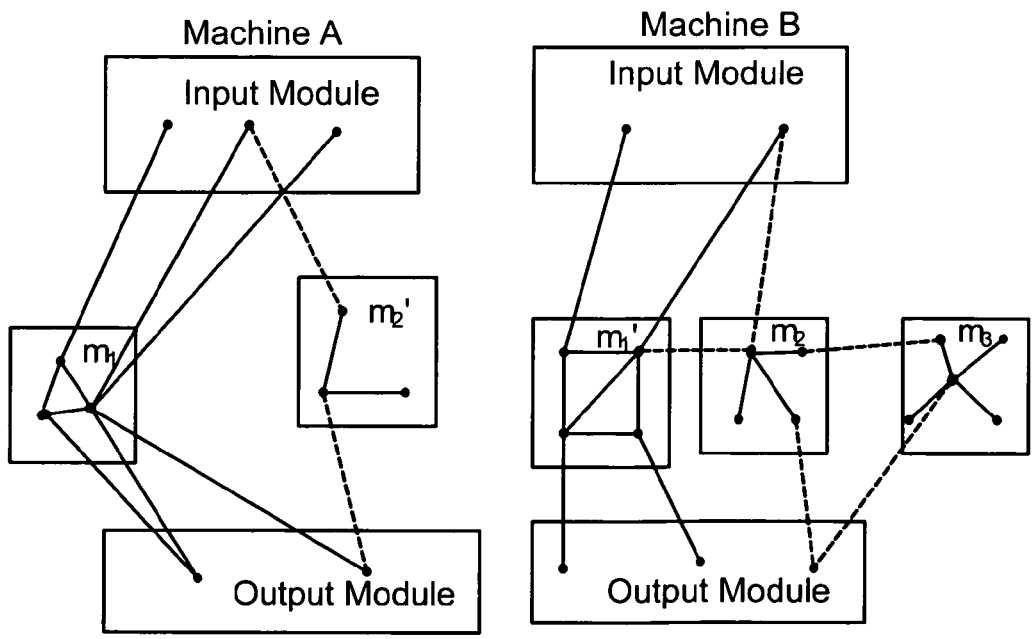
-------------------- New External Connections Error Tolerance in Effectors

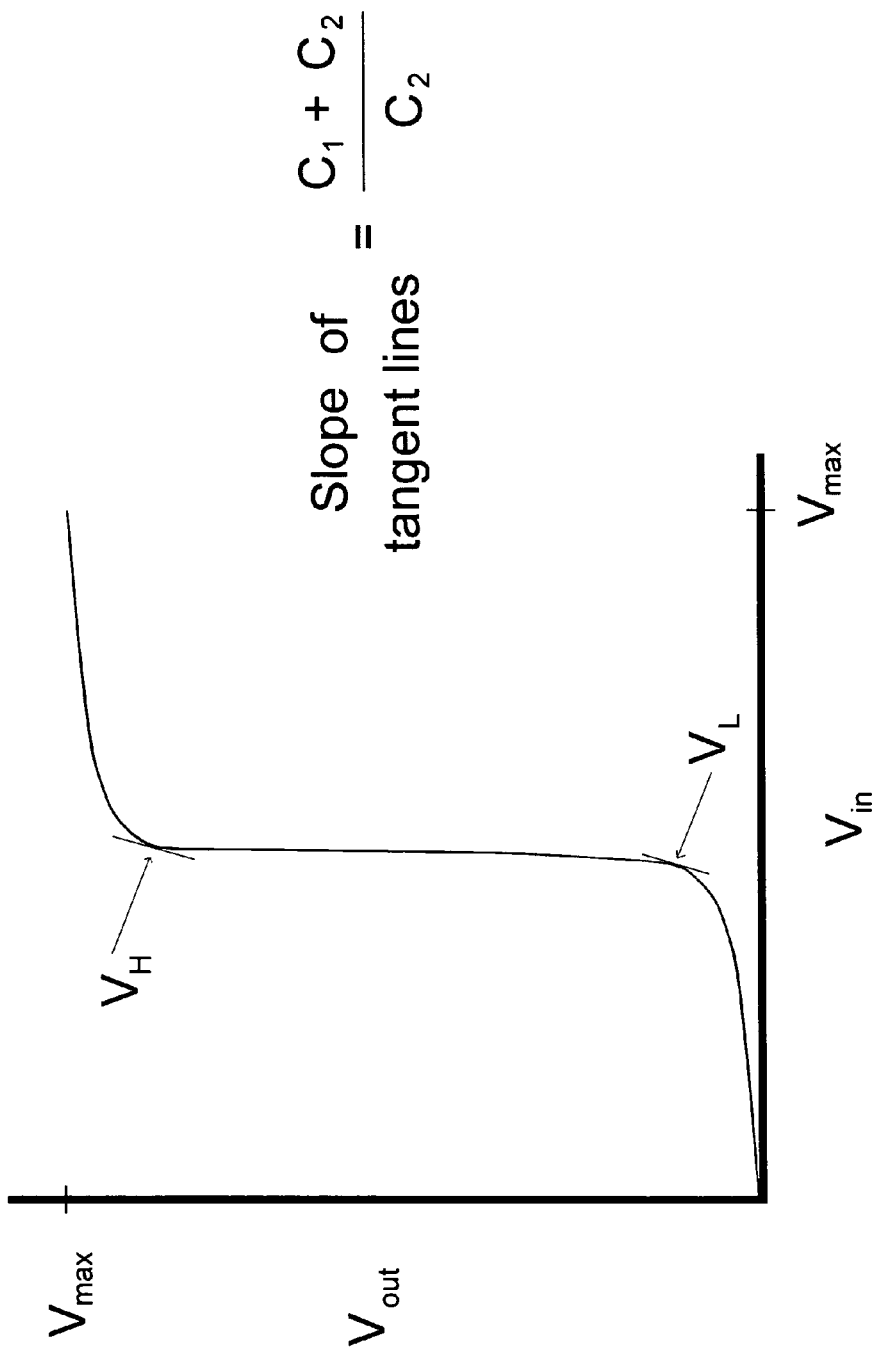

US 8,010,467 B2

ACTIVE ELEMENT MACHINE COMPUTATION

CROSS-REFERENCE TO RELATED APPLICATIONS

This application is a continuation-in-part of U.S. patent application Ser. No. 10/791,249, filed Mar. 2, 2004, now U.S. Pat. No. 7,398,260, which claims priority benefit of U.S. Provisional Patent Application No. 60/456,715, filed on Mar. 24, 2003.

FIELD

The subject matter of this specification has been influenced by Alan Turing's work in mathematics and computer science and Wilfred Rall's research in neurophysiology.

BACKGROUND

In a standard digital computer, the only active computing elements (which will be referred to as active elements) are specialized registers in the microprocessor. The active elements play a role in performing computations. Usually only one machine instruction can be computed at a time. This creates a computational bottleneck.

The following references are incorporated herein by reference: [Adelman_1] L. Adleman, "Molecular computation of solutions to combinatorial problems," *Science* v. 266, Nov. 1994, 1021-1024; [Adelman_2] L. Adleman. On constructing a molecular computer, ftp://usc.edu/pub/csinfo/papers/adleman; [Bledsoe] Bledsoe, W. W. (1961), "The use of biological concepts in the analytical study of systems," ORSA-TIMS National Meeting, San Francisco, Calif.; [Box] Box, G. E. P. (1957) "Evolutionary operation: A method for increasing industrial production," Journal of the Royal Statistical Society, C, 6(2), 81-101; [Bremermann] Bremermann, R. J. (1962) "Optimization through evolution and recombination. Self-organizing systems," pp. 93-106, Washington, D.C., Spartan Books; [Enderton] Enderton, Herbert B. (1972) A Mathematical Introduction to Logic, Academic Press, Inc., ISBN 0-12-238450-4, pp. 50-58; [Friedman] Friedman, G. J. (1959) "Digital simulation of an evolutionary process," General Systems Yearbook, 4, pp. 171-184; [Gershenfeld], N. A. Gershenfeld and I. L. Chuang, "Bulk spin resonance quantum computation, " *Science* 275 (1997), 350-356; [Kane], B. E. Kane, "A silicon-based nuclear spin quantum computer, " *Nature* 393 (1998), pp. 133-137. [Kari], Lila Kari, "DNA computing: arrival of biological mathematics," The Mathematical Intelligence, vol. 19, 2(1997), 9-22; [Mead] Mead, Carver, (1989) *Analog VLSI and Neural Systems*, Addison-Wesley Publishing Company, ISBN 0-201-05992-4; [Rall] Rall, Wilfrid. (1995) *The Theoretical Foundation of Dendritic Function*, MIT Press. ISBN 0-262-19356-6; [Shor] Peter Shor, Quantum Computing, Documenta Mathematica, Extra Volume ICM 1998, I, 467-486; [Turing] Turing, Alan M. (1936) "On Computable Numbers, with an Application to the Entscheidungsproblem," Proceedings, London Mathematical Society, 2, no. 42, 230-265, and no. 43, 544-546.

BRIEF DESCRIPTION OF THE FIGURES

In the following drawings like reference numbers are used to refer to like elements. Although the following figures depict various examples of the invention, the invention is not limited to the examples depicted in the figures.

FIGS. 1B-J show plots of amplitudes of messages and an input function associated with the four active elements.

FIG. 2 shows an example of a directed graph that has a cycle and an example of a directed graph that does not have a cycle.

FIG. 4 shows an example of how CGE executes a crossover between two machines.

FIG. 7 shows an amplifier behavior of a collection of transistors in FIG. 6, which is described in the specification.

DETAILED DESCRIPTION

Figure 1A:
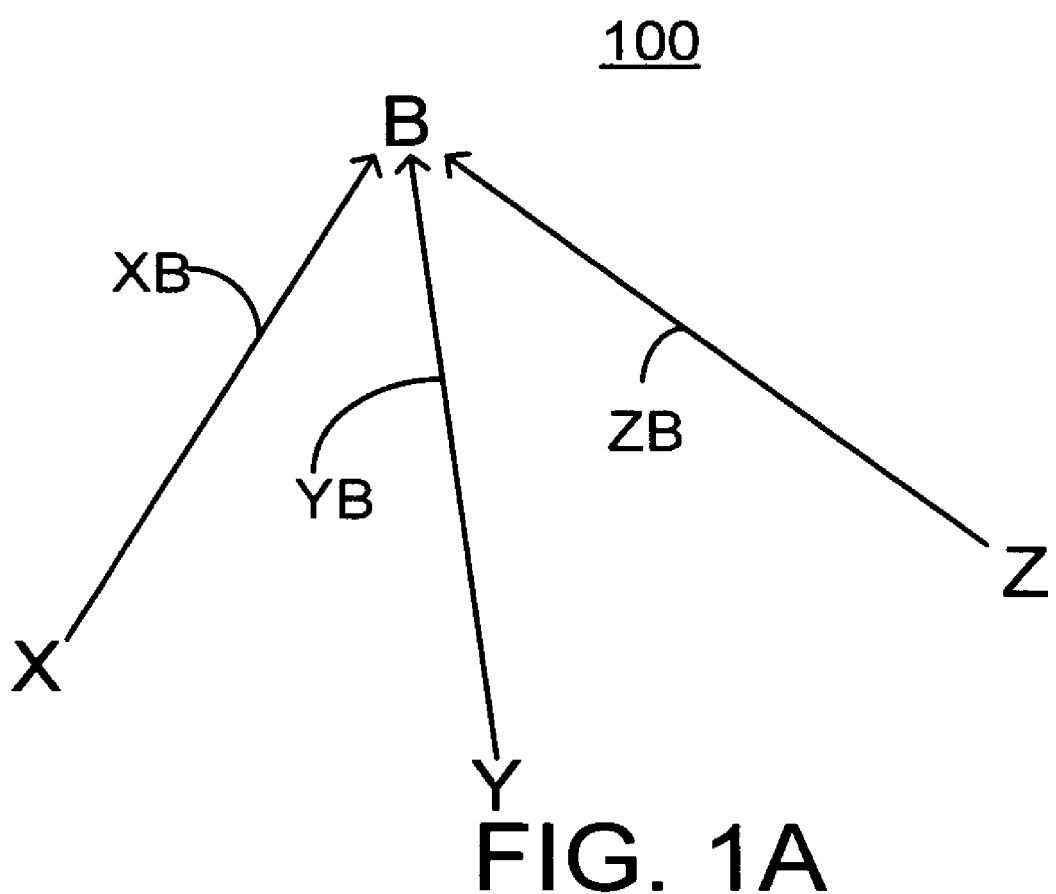
FIG. 1A show an example of a system of four active elements.

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies that may be discussed in the specification, and some embodiments may not address any of these deficiencies. Although this specification is divided into sections, nonetheless, there is no one location where all of the information of any element is necessarily located. Unique information about any particular element or any other aspect of any of the invention may be found in, or implied by, any part of the specification.

Active Elements

An active element is any element that is capable of performing computations; an "active element" is a computing element that is capable of both receiving and sending messages. Active computing elements can be any number of different types of elements. For example, an active element may be implemented with one or more registers that together are capable of sending and receiving messages. As an alternative to a register, an active element may be implemented as a collection of transistors, operating at subthreshold, and other electronic components, as will be discussed in conjunction with FIG. 6. At the quantum level, an active element may be a collection of one or more quantum gates, [Gershenfeld], [Kane], and [Shor]. An active element may be a collection of DNA that is designed to perform computations, [Adelman_1], [Adelman_2], and [Kari]. An active element may be an artificial neuron, composed of organic molecules such as a bi-lipid layer, with voltage-gated proteins embedded in the bi-lipid layer.

A collection of active elements may be assembled to form a computing machine. In this specification, the term "active" or "active element" is used in many places where in the parent application the term effector was used. The term "active element" is generic to, but broader than, the term "effector."

Messages

In an embodiment, each message associated with an active element is a single pulse. In another embodiment, each message is composed of one or more pulses and/or other wave forms, and thus may be composed of a multiplicity of pulses. A machine may only allow active elements to send and/or receive one type of message or a multiplicity of types of messages.

Computing Machines Including One or More Collections of Active Elements

In an embodiment, a computing machine is constructed such that every computing element is active, and consequently any possible bottleneck is expected to be reduced because instead of only a small number of computing elements being able to participate in the computation any of the computing elements can participate in the computation. A computing machine having multiple active elements may be referred to as an active element machine (which is generic to an Effector machine). In an embodiment, the collection of active computing elements can execute multiple machine instructions simultaneously. The computing machine can be implemented in hardware and/or software. In an embodiment in which the computing machine is implemented in hardware, constructing a computing machine from a collection of active computing elements that can execute machine instructions simultaneously is expected to increase the computing speed over current digital computers for a large variety of computations. In another embodiment, the machine includes a multiplicity of active elements and also includes other computing elements.

Types of Active Elements

There are many different types of active elements that may be used to form a computing machine. In an embodiment, in a machine there are at least two kinds of active elements, which are input elements and output elements. In another embodiment there are also computational elements.

Input elements are capable of receiving, or receive, information from the environment (e.g., external sources), another machine, and/or a program, depending on the embodiment. Input elements may send messages to their selves, computational elements (if present), output elements, and/or other input elements, depending on the embodiment.

Computational elements are capable of receiving, or receive, messages from the input elements, and/or other computational elements, depending on the embodiment. A given computational element may send messages to itself, other computational elements, output elements, and/or input elements. The output elements receive messages from the input elements and computational elements (if computational elements are present). The output of the output elements represents the output of the machine.

Output elements may send messages to receptors external to the machine, itself, other computational elements, output elements, and/or input elements, depending on the embodiment. Receptors external to the machine may be other machines, other active elements that are not part of the machine or other types of receptors.

In the discussion below, the variables $\Gamma$, $\Lambda$, $\Delta$ represent index sets, used to index the input elements, computational elements, and output elements, respectively. Also, a set of input elements may be represented by the J, a set of computational elements may be represented by C, and a set of output elements may be represented by D. A machine including input elements J, computational elements C, and output elements D may be represented by M(J, C, D). For example, a machine M(J, C, D) consists of a collection of input active elements, denoted as $J=\{E_i: i\in\Gamma\}$; a collection of computational active elements, $C=\{E_i: i\in\Lambda\}$; and a collection of output active elements, $D=\{E_i: i\in\Delta\}$, where $E_i$ is the ith active element and the symbol $\epsilon$ means "is an element of." In other words, a machine may be characterized by the sets of active elements, J, C, and D, where J represents the set of active elements having indices that belong to the set $\Gamma$, and are therefore input elements; C represents the set of active elements having indices that belong to the set $\Lambda$, and are therefore computational elements; and D represents the set of active elements having indices that belong to the set $\Delta$, and are therefore output elements.

Machine Architecture

The manner in which the active elements are capable of sending messages to one another is at least part of the architecture of the machine. In this specification, the active element that is sending the message may be referred to as the sender or as the sending active element, and the active element receiving the message may be referred to as the receiving active element or as the receiver. However, the sender may also be capable of being a receiver and the receiver may also be capable of being a sender. In an embodiment, when a sender is said to "fire" the sender sends a message to whichever set of receivers the sender is capable of sending a messages to. In another embodiment, it may be possible for a sender to selectively choose which receivers a given message is sent to, and to change the set of receivers a given message is sent to each time the sender fires.

In an embodiment in which the messages are composed of pulses or in which the messages have one or more amplitudes associated with them, the one or more amplitudes associated with the messages sent are dependent on both the receiver and the sender. Thus, for example, if a sender fires, a multitude of messages may be sent to a multitude of different receivers, respectively (each message may have a different set of one or more amplitudes). It is possible that a sender may fire, but the amplitudes associated with all of the messages (e.g., pulses) that are sent as a result of the firing are zero. Thus, despite the firing of a sender, the effect may be no different than no actual message being sent, because all of the messages that are sent as a result of the firing have an amplitude that is equal to zero. In another embodiment, the amplitude of a message may only be dependent on the receiver. In another embodiment, the amplitude of a message may only be dependent on the sender.

In different machine architectures different types of active elements (e.g., input elements $\Gamma$, computational elements $\Lambda$, and output elements $\Delta$) are allowed to be connected to one another. Depending on the particular machine architecture, it is possible for the intersections $\Gamma\cap\Lambda$ and $\Lambda\cap\Delta$ to be empty sets or non-empty sets, where the symbol $\cap$ is used to indicate the intersection of two sets. The intersection of two sets is the set of elements that is common to both sets. If $\Gamma\cap\Lambda$ is empty, then there are no active elements that belong to the set of input elements, $\Gamma$, and computational elements, $\Lambda$. Conversely, if $\Gamma\cap\Lambda$ is not empty, then there is at least one active element that is both an input element and a computational element. Similarly, if $\Lambda\cap\Delta$ is empty, then there is no active element that are both a computational element and an output element, while if $\Lambda\cap\Delta$ is not empty, then there is at least one active element that is both a computational element and an output element. In an embodiment, an active element, $E_i$, can be an input element and a computational element. Likewise, in an embodiment, an active element can be an output element and a computational element. In this embodiment, when an output element, $E_i$, is not a computational element, in other words when $i\in\Delta$, then $E_i$ does not send messages to active elements in this machine.

Refractory Period

In an embodiment, each computational element and output element has a refractory period $r_i$, where $r_i>0$, which is a period of time that must elapse after last sending a message before it may send another message. In other words, the refractory period, $r_i$, is the amount of time that must elapse after active element $E_i$ just fired and before active element $E_i$ can fire again. In an alternative embodiment, refractory period $r_i$ could be zero, and the active element could send a message simultaneously with receiving a message and/or could handle multiple messages simultaneously.

Message Amplitude and Width

In an embodiment, each computational element and output element may be associated with a collection of message amplitudes, $\{A_{ki}\}_{k \in \Gamma \cup \Lambda}$, where the first of the two indices k and i denote the active element from which the message associated with amplitude $A_{ki}$ is sent, and the second index denotes the active element receiving the message. The amplitude, $A_{ki}$, represents the strength of the message that active element $E_k$ transmits to active element $E_i$ after active element $E_k$ has fired. There are many different measures of amplitude that may be used for the amplitude of a message. For example, the amplitude of a message may be represented by the maximum value of the message or the root mean square height of the message. The same message may be sent to multiple active elements that are either computational elements or output elements, as indicated by the subscript $k \in \Gamma \cup \Lambda$. However, each message may have a different amplitude $A_{ki}$. Similarly, each message may be associated with its own message width, $\{\omega_{ki}\}_{k \in \Gamma \cup \Lambda}$, sent from active element $E_i$ to $E_k$, where $\omega_{ki} > 0$ for all $k \in \Gamma \cup \Lambda$. After a message reaches active $E_i$, the message width $\omega_{ki}$ represents how long the message lasts as input to active element $E_i$.

Threshold

In an embodiment, any given active element may be capable of sending and receiving a message, in response to receiving one or more messages, which when summed together, have an amplitude that is greater than a threshold associated with the active element. For example, if the messages are pulses, each computational and output active element, $E_i$, may have a threshold, $\theta_i$, such that when a sum of the incoming pulses is greater than the threshold the active element fires (e.g., sends an output message). In an embodiment, when a sum of the incoming messages is lower than the threshold the active element does not fire. In another embodiment, it is possible to set the active element such that the active element fires when the sum of incoming messages is lower than the threshold; and when the sum of incoming messages is higher than the threshold, the active element does not fire.

In still another embodiment, there are two numbers $\alpha$ and $\theta$ where $\alpha \leq \theta$ and such that if the sum of the incoming messages lie in $[\alpha, \theta]$, then the active element fires, but the active element does not fire if the sum lies outside of $[\alpha, \theta]$. In a variation of this embodiment, the active element fires if the sum of the incoming messages does not lie in $[\alpha, \theta]$ and does not fire if the sum lies in $[\alpha, \theta]$.

In another embodiment, the incoming pulses may be combined in other ways besides a sum. For example, if the product of the incoming pulses is greater than the threshold the active element may fire. Another alternative is for the active element to fire if the maximum of the incoming pulses is greater than the threshold. In still another alternative, the active element fires if the minimum of the incoming pulses is less than the threshold. In even another alternative if the convolution of the incoming pulses over some finite window of time is greater than the threshold, then the active element may fire.

Transmisson Time

In an embodiment, each computational and output element may be associated with collection of transmission times, $\{\tau_{ki}\}_{k \in \Gamma \cup \Lambda}$, where $\tau_{ki} > 0$ for all $k \in \Gamma \cup \Lambda$, which are the times that it takes a message to be sent from active element $E_k$ to active element $E_i$. The transmission time, $\tau_{ki}$, is the amount of time it takes for active element $E_i$ to find out that active element $E_k$ has fired. The transmission times, $\tau_{ki}$, may be chosen in the process of establishing the architecture.

Firing Function

In an embodiment, each active element is associated with a function of time, $\psi_i(t)$, representing the time t at which active element $E_i$ last fired. Mathematically, the function of time can be defined as $\psi_i(t)=$supremum $\{s \in R: s<t \text{ AND } g_i(s)=1\}$. The function $\psi_i(t)$ always has the value of the last time that the active element fired. In general, throughout this specification the variable t is used to represent the current time, while in contrast s is used as variable of time that is not necessarily the current time.

Set of Firing Times and the Integrating Window

In an embodiment, each active element is associated with a function of time $\Xi_{ki}(t)$, which is a set of recent firing times of active element $E_k$ that are within active element $E_i$'s integrating window. In other words, the set of firing times $\Xi_{ki}(t) = \{s \in R: \text{active element k fired at time s and } 0 \leq t-S-\tau_{ki}<\omega_{ki}\}$. The integrating window is a duration of time during which the active element accepts messages. The integrating window may also be referred to as the window of computation. Other lengths of time could be chosen for the integrating window. In contrast to $\psi_i(t)$, $\Xi_{ki}(t)$ is not a function, but a set of values. Also, where as $\psi_i(t)$ has a value as long as active element $E_i$ fired at least once, $\Xi_{ki}(t)$ does not have any values (is an empty set) if the last time that active element $E_i$ fired is outside of the integrating window. In other words, if there are no firing times, s, that satisfy the inequality $0 \leq t-s-\tau_{ki}<\omega^{ki}$, then $\Xi_{ki}(t)$ is the empty set. Let $|\Xi_{ki}(t)|$ denote the number of elements in the set $\Xi_{ki}(t)$. If $\Xi_{ki}(t)$ is the empty set, then $|\Xi_{ki}(t)|=0$. Similarly, if $\Xi_{ki}(t)$ has only one element in it then $|\Xi_{ki}(t)|=1$.

Input Function

In an embodiment, each input element and output element may have associated with it a collection of input functions, $\{\emptyset_{ki}(t)\}_{k \in \Gamma \cup \Lambda}$. Each input function may be a function of time, and may represent messages coming from computational elements and input elements. The value of input function $\emptyset_{ki}(t)$ is given by $\emptyset^{ki}(t)=|\Xi_{ki}(t)|A_{ki}$, because each time a message from active element $E_k$ reaches active element $E_i$, the amplitude of the message is added to the last message. The number of messages inside the integrating window is the same as the value of $|\Xi_{ki}(t)|$. Since for a static machine the amplitude of the message sent from active element k to i is always the same value, $A_{ki}$, therefore, the value $\emptyset_{ki}(t)$ equals $|\Xi_{ki}(t)|A_{ki}$.

Input elements that are not computational elements have the same characteristics as computational elements, except they have no input functions, $\emptyset_{ki}(t)$, coming from active elements in this machine. In other words, input elements do not receive messages from active elements in the machine with which the input element is associated. In an embodiment, input elements are assumed to be externally firable. An externally firable element is an element that an external element or machine can cause to fire. In an embodiment, an external source such as the environment or an output element from another distinct machine, M'(J'; E';D') can cause an input element to fire. An input element can fire at any time as long as this time minus the time the input element last fired is greater than or equal to the input element's refractory period.

Output Function

An output function, $g_i(t)$, may represent whether the active element fires at time t. The function $g_i(t)$ is given by $$g_i(t) = \begin{cases} 1 & \text{if } \sum_{k \in \Gamma \cup \Lambda} \emptyset_{ki}(t) > \theta_i \text{ AND } t - \psi_i(t) \geq r_i \\ 0 & \text{otherwise} \end{cases}.$$

In other words, if the sum of the input functions $\emptyset_{ki}(t)$ is greater than the threshold, $\theta_i$, and time t is greater than or equal to the refractory period, $r_i$, plus the time, $\psi_i(t)$, that the active element last fired, then the active element $E_i$ fires, and $g_i(t)=1$. If $g_i(t_0)=1$, then active element $E_i$ fired at time $t_0$.

The fact that in an embodiment, output elements do not send messages to active elements in this machine is captured formally by the fact that the index k for the transmission times, message widths, message amplitudes, and input functions lies in $\Gamma \cup \Lambda$ and not in $\Delta$ in that embodiment.

Connections

The expression "connection" from k to i represents the triplet $(A_{ki}; \omega_{ki}; \tau_{ki})$. If $A_{ki}=0$, then there is no connection from active element $E_k$ to active element $E_i$. If $A_{ki} \neq 0$, then there is a non-zero connection from active element $E_k$ to active element $E_i$. In any given embodiment the active elements may have all of the above properties, only one of the above properties, or any combination of the above properties. In an embodiment, different active elements may have different combinations of the above properties. Alternatively, all of the active elements may have the same combination of the above properties.

Examples of Specific Machine Architecture

Two examples of the many different types of possible machine architectures are a static machine and dynamic machine, which are described below in the next two sections.

Static Machine

In a static machine M(J, C, D), the properties of the active elements do not change over time. Although the active elements of a static machine are associated with functions of time (e.g., the input and output functions, the firing function, and the set of firing times), there are certain parameters that do not change with time. For example, in an embodiment in a static machine the connections (e.g., the message amplitudes, the message widths, and the transmission times) are not functions of time.

In a static machine the contents of sets J, C, and D do not change overtime. A user may be able to determine the times at which different active elements fire. A user may be able to set the properties of the static machine prior to using the static machine, but the properties of the static machine do not change while a program is running. In other embodiments, static machines may have other parameters that change over time.

Dynamic Machine

The active elements of a dynamic machine may have many of the same functions of time as a static machine, such as the input and output functions, the firing function, and the set of firing times. In a dynamic machine the connections $(A_{ki}(s); \omega_{ki}(s); \tau_{ki}(S))$ may be functions of time or of the firing times. In other words, each of the connection variables, $A_{ki}(s)$, $\omega_{ki}(s)$, and $\tau_{ki}(s)$, is a function of s, which is a parameter for time. Thus, the message amplitudes, message widths and transmission times may change over time. In other embodiments other parameters may also be a function of time instead of, or in addition to, the connection parameters. The dependence of the connection parameters on time affects other parameters that depend on the connection variables. For example, in a dynamic machine, the set of recent firing times $\Xi_{ki}(t)$ becomes $\Xi_{ki}(t)=\{s \in R: \text{Effector k fired at time s and } 0 \leq t-s-\tau_{ki}(s) < \omega_{ki}(S)\}$. Similarly, in an embodiment of a dynamic machine, the input functions become $$\emptyset_{ki}(t) = \sum_{s \in \Xi_{ki}(t)} A_{ki}(s),$$

where $\{\emptyset_{ki}(t)\}_{k \in \Gamma \cup \Lambda}$ is a collection of input functions. In other embodiments, dynamic machines may have other parameters that change over time.

EXAMPLE 1

FIG. 1A shows a system 100, which includes active elements B, X, Y, and Z. System 100 also include connections XB, YB, and ZB. Active element X is connected, via connection XB, to active element B. System 100 may be located within a machine, which may have many other active elements. Active element Y is connected, via connection YB, to active element B. Active element Z is connected, via connection ZB, to active element B. This example shows how the firings of active elements X, Y, and Z affect active element B. Active element X, fires at time t=4, active element Y fires at time t=1, and active element Z fires at t=2. The symbol $A_{XB}$=3 is the message amplitude from active element X to active element B. The message width from active element X to active element B is $\omega_{XB}$=2. The transmission time from active element X to active element B is $\tau_{XB}$=1. The transmission time $\tau_{XB}$ represents how long it takes for a message from active element X to arrive at active element B after active element X fires. These values are presented in the following table.

|  | Message Amplitude $A_{XB}$ | Message Width $\omega_{XB}$ | Transmission Time $\tau_{XB}$ | Firing Time |
|---|---|---|---|---|
| From active element X To To active element B | 3 | 2 | 1 | 4 |

Similarly, the values below represent the message amplitude, message width and transmission time from active element Y to active element B. Also, included is the time that active element Y last fired.

|  | Message Amplitude $A_{YB}$ | Message Width $\omega_{YB}$ | Transmission Time $\tau_{YB}$ | Firing Time |
|---|---|---|---|---|
| From active element Y To To active element B | 4 | 1 | 3 | 1 |

Similarly, the values below represent the message amplitude, message width and transmission time from active element Z to active element B. Also, included is the time that active element Z last fired.

|  | Message Amplitude $A_{ZB}$ | Message Width $\omega_{ZB}$ | Transmission Time $\tau_{ZB}$ | Firing Time |
|---|---|---|---|---|
| From active element Z To To active element B | 4 | 2 | 2 | 2 |

FIGS. 1B-1I show a sequence of events associated with system 100. These figures are a convenient method for a person to understand the behavior of an active element. FIGS. 1B-1I correspond to times t=0 to t=7. In each of FIGS. 1B-1I there are four plots B, X, Y, and Z. Plots X, Y, and Z show the firing times of active elements X, Y, and Z and the times of arrival at active element B of the messages associated with connections XB, YB, and ZB, respectively. The differences between the firing times of active elements X, Y, and Z and the arrival times at active element B are the transmission times associated with connections XB, YB, and ZB.

Plot X shows the message from active element X on connection XB, and shows a firing time at t=4 and an arrival time at t=5. Plot Y shows the message from active element Y on connection YB, and shows a firing time at t=1 and an arrival time at t=4. Plot Z shows the message from active element Z on connection ZB, and shows a firing time at t=2 and an arrival time at t=4. Plot B shows the sum of the amplitudes of the messages that are arriving at active element B.

As shown in FIG. 1B, at time t=0, none of the active elements have fired, and consequently none of the plots X, Y, and Z show a message. Similarly, since no message has arrived at active element B, the amplitude arriving at active element B is shown as 0 in plot B.

As shown in FIG. 1C, at time t=1, active element Y fires, while active elements X and Z have not fired. Consequently, plot Y shows a message emerging from active element Y, and there are no messages shown on plots X and Z. Since the amplitude associated with connection YB is 4, message on plot Y has a height of 4. Although the message width associated with connection YB is 1, since the message is just beginning to emerge from active element Y, the message is shown as a line. Since no messages have arrived at active element B, the amplitude arriving at active element B is still shown as 0 in plot B.

As shown in FIG. 1D, at time t=2, zero units of time have passed since active element Z fired, one unit of time has passed since active element Y fired, and active element X has still not fired. Consequently, plot Y shows a message of width 1 emerging from active element Y, plot Z shows a message just beginning to emerge from active element Z, and no message is shown on plot X. Since the amplitude associated with connection ZB is 4, message on plot Z has a height of 4. The message shown on plot Y has now reached its full width, because the message width associated with connection YB is 1. Although the message width associated with connection ZB is 2, since the message is just beginning to emerge from active element Z, the message on shown plot Z is as a line. Since no messages have arrived at active element B, the amplitude arriving at active element B is still shown as 0 in plot B.

Figure 1E:
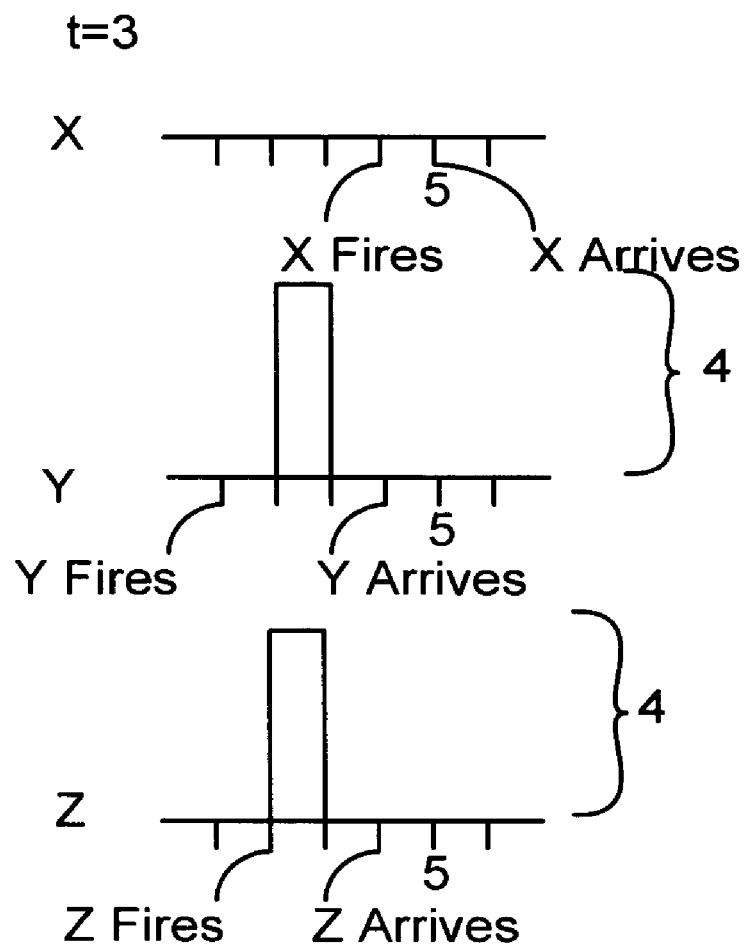

As shown in FIG. 1E, at time t=3, one unit of time has passed since active element Z began to fire, two units of time has passed since active element Y fired, and active element X has still not fired. Consequently, plot Y shows a message of width 1 displaced one unit of time from the firing time of active element Y, plot Z shows a message of width 1 that is still emerging from active element Z, and no message is shown on plot X. Although the message width associated with connection ZB is 2, since only one unit of time has passed since the message began to emerge from active element Z, the message shown plot Z is only one unit of time wide. Since no messages have arrived at active element B, the amplitude arriving at active element B is still shown as 0 in plot B.

As shown in FIG. 1F, at time t=4, two units of time has passed since active element Z fired, three units of time has passed since active element Y fired, and active element X fires. Consequently, plot Y shows a message of width 1 displaced three units of time from the firing time of active element Y, plot Z shows a message of width 2 emerging from active element Z, and a message at time 4 is shown on plot X. The message on plot Z has reached its full width. Although the message width associated with connection XB is 2, since the message just began to emerge from active element X, the message shown plot X is only a line. Since the amplitude of the message associated with connection XB is 3, the height of the message on plot X is shown as 3. The messages shown on plots Y and Z have just begun to arrive at active element B, and the amplitude of each is 4. Consequently, the sum of the amplitudes of the messages arriving at active element B is 8, as shown in plot B. If the threshold associated with active element B is less than 8, and if the refractory period is has passed, active element B will fire.

Figure 1G:
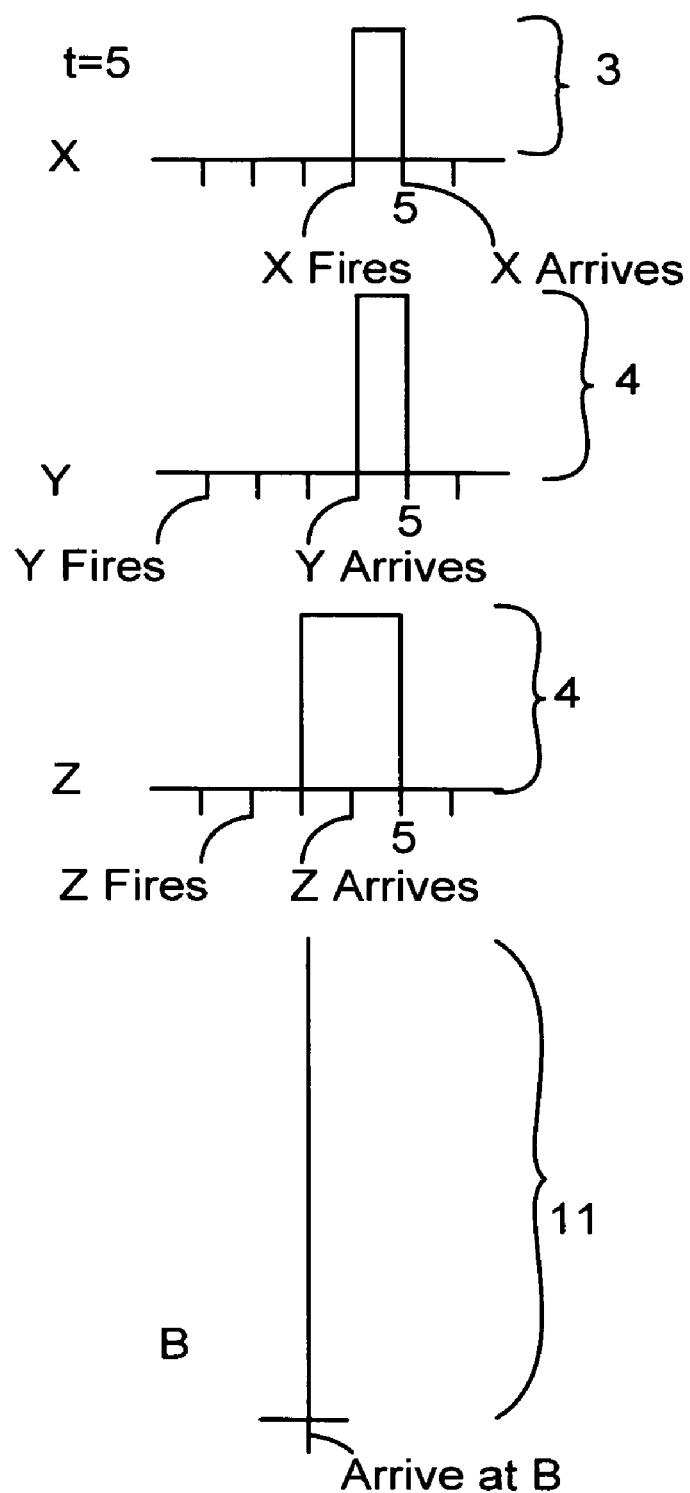

As shown in FIG. 1G, at time t=5, one unit of time has passed since active element X fired, three units of time has passed since active element Z began to fire, and four units of time has passed since active element Y began to fire. Consequently, plot Y shows a message of width 1 displaced four units of time from the firing time of active element Y, plot Z shows a message of width 2 displaced three units of time from the firing time of active element Z, and a message of width 1 emerging from active element X. Although the message width associated with connection XB is 2, since only one unit of time has passed since the message began to emerge from active element X, the message shown in plot X is only one unit of time wide. The message shown on plot Y is just finishing its arrival at active element B, the message shown on plot Z is still in the middle of arriving at active element B, and the message shown on plot X is just beginning to arrive at active element B. Consequently, the sum of the amplitudes of the messages arriving at active element B is now 11, as shown in plot B. If the threshold associated with active element B is less than 11, and if the refractory period has passed, active element B will fire. For example, in an embodiment, if the refractory period is 1, and the threshold is 6, then the active element will have fired twice, once at time t=4, when the sum of the amplitudes of the messages arriving at active element B was 8, and a second time at time t=5 when the sum of the amplitudes of the messages arriving at active element B is 11. Similarly, if the refractory period is 0.49, at time t=5, active element B will have fired 3 times: at time t=4, t=4.49, and t=4.98.

As shown in FIG. 1H, at time t=6, two units of time has passed since active element X fired, four units of time has passed since active element Z began to fire, and five units of time has passed since active element Y began to fire. Consequently, plot Y shows a message of width 1 displaced four units of time from the firing time of active element Y, plot Z shows a message of width 2 displaced two unit of time from the firing time of active element Z, and a message of width 2 emerging from active element X. The message width associated with connection XB is 2, and consequently, the message shown on plot X has reached its full width. The message shown on plot Z is just finishing arriving at active element B, and the message shown on plot X is also still in the middle of arriving at active element B. The message shown on plot Y is no longer arriving at active element B, and the amplitude of the message on connection YB (which is 4) is no longer added to the sum of amplitudes of messages arriving at active element B. Consequently, the sum of the amplitudes of the messages arriving at active element B is the sum of the amplitude of the messages associated with connections XB (which has a height of 3) and ZB (which has a height of 4), which sums to just 7, as shown in plot B. If the threshold associated with active element B is less than 7, and if the refractory period has passed, active element B will fire.

Figure 1I:
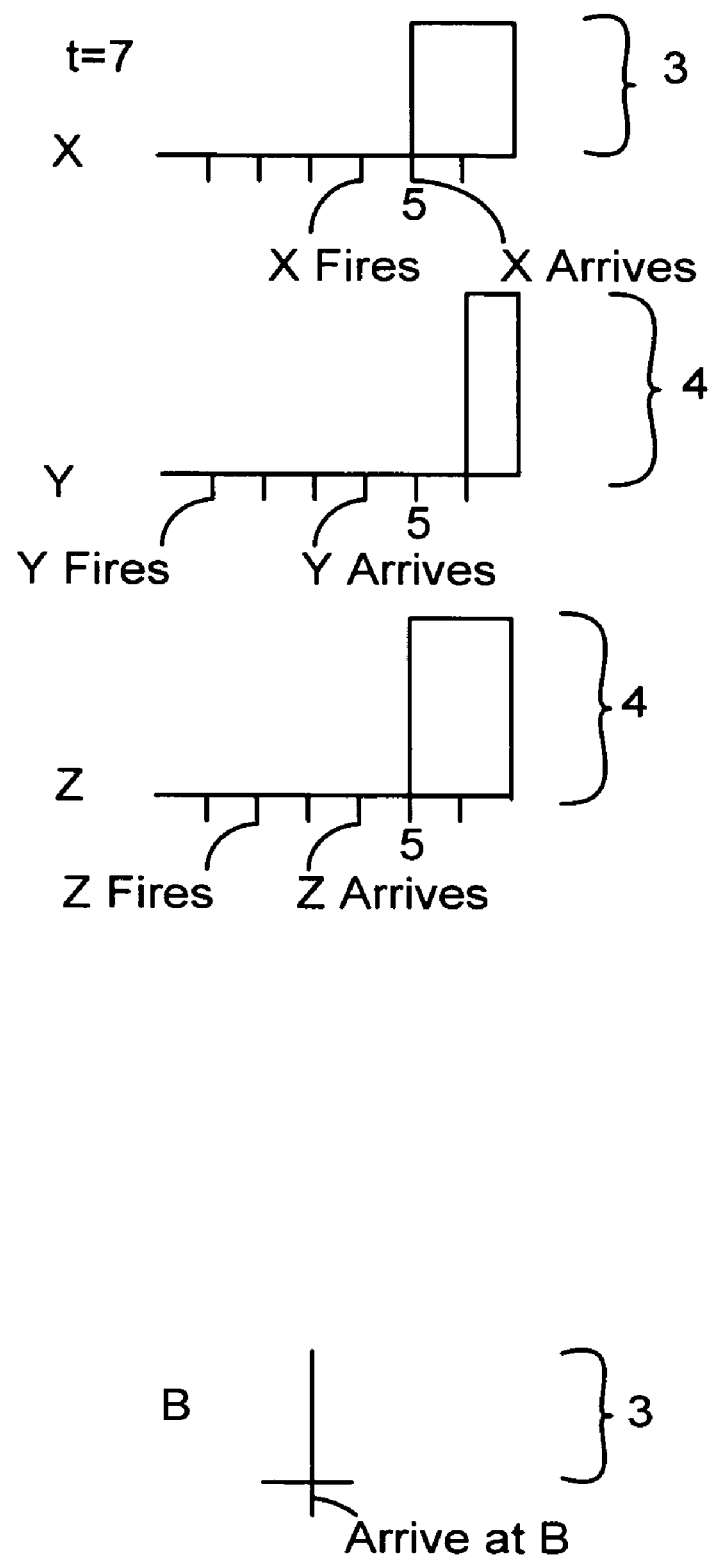

As shown in FIG. 1I, at time t=7, three units of time has passed since active element X fired, five units of time has passed since active element Z began to fire, and six units of time has passed since active element Y began to fire. Consequently, plot Y shows a message of width 1 displaced six units of time from the firing time of active element Y, plot Z shows a message of width 2 displaced five units of time from the firing time of active element Z, and a message of width 2 displaced three units of time from the firing time of active element X. The message shown on plot X is just finishing arriving at active element B. The messages shown on plots Y and Z are no longer arriving at active element B, and the amplitudes of the message on connection YB and ZB are no longer added to the sum of amplitudes of messages arriving at active element B. Consequently, the sum of the amplitudes of the messages arriving at active element B only includes the amplitude of the message associated with connection XB, and consequently the sum of messages arriving at active element B is 3. If the threshold associated with active element B is less than 3, and if the refractory period has passed, active element B will fire.

Figure 1J:
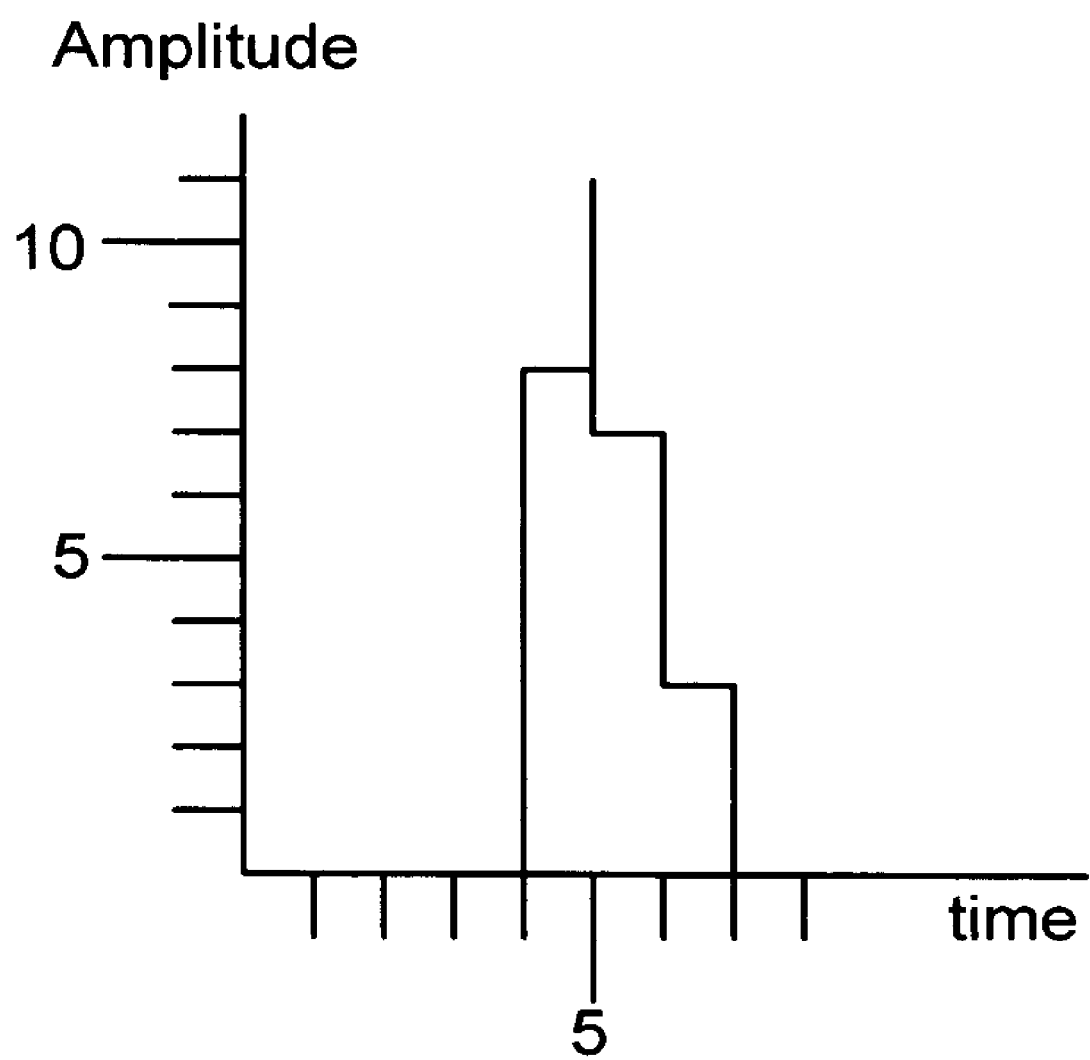

FIG. 1J shows a plot of the sum of amplitudes as a function of time, which corresponds to plot B of FIGS. 1B-I. At time t=4 the sum of amplitudes at active element B is 8, and remains at 8 until time t=5. At time t=5, the amplitude momentarily jumps to 11 and then declines to 7. The amplitude remains at 7 until time t=6. At time t=6, the amplitudes drops to 3, and remains at 3 until time t=7. At time t=7, the amplitude drops to zero. If the threshold of active element B is less than 3, then active element B may fire at anytime between time t=4 and t=7, depending on the value of the refractory period. If the threshold of active element B is greater than 3 and less than 7, then active element B may fire at anytime between time t=4 and t=6, depending on the value of the refractory period. If the threshold of active element B is greater than 7 and less than 8, then active element B may fire at anytime between time t=4 and t=5, depending on the value of the refractory period. If the threshold of active element B is greater than 8 and less than 11, then active element B may fire at time t=5, depending on the value of the refractory period.

EXAMPLE 2

Suppose an incoming message from active element $E_X$ arrives at active element $E_B$. Suppose active element $E_X$ fires at time s=2. Suppose the transmission time $\tau_{XB}$ from active element $E_X$ to active element $E_B$ is given by $\tau_{XB}$=5, and the message width $\omega_{XB}$=2. Assume also that the current time is t=6.99. It follows that $\Xi_{XB}(6.99)=\emptyset$, because t-s-$\tau_{XB}$=6.99-2-5=-0.01 is not in the interval [0, $\omega_{XB}$], and therefore |$\Xi_{ki}$(t)|=0. This is because the message from active element $E_X$ has not yet arrived at active element $E_B$. Therefore, based on the definition $\Phi_{XB}(6.99)=|\Xi_{ki}(6.99)|A_{XB}$, it follows that $\Phi_{XB}$(6.99)=0, because |$\Xi_{XB}$(6.99)|=0.

However, at the time t=7, t-s-$\tau_{XB}$=7-2-5=0, which is within the interval [0, $\omega_{XB}$]. Consequently, $\Xi_{XB}(7)=\{2\}$, because the value of $\Xi_{XB}$(7) is the set of firing times. Although $\Xi_{XB}(7)=\{2\}$, the value of |$\Xi_{XB}$(7)| is given by |$\Xi_{XB}$(7)|=1 because |$\Xi_{XB}$(7)| is the number of elements in the set $\Xi_{XB}$(7). Assume that $A_{XB}$=2, then based on the formula $\Phi_{XB}(7)=|\Xi_{XB}(7)|A_{XB}$, it follows that, $\Phi_{XB}$(7)=1, because t-s-$\tau_{XB}$ lies in the interval [0, $\omega_{XB}$]. The calculation is t-s-$\tau_{XB}$=7-2-5=0 and 0 lies in [0, 2]. Time t=7 is the time when the message from active element $E_X$ first arrives at active element $E_B$. Therefore, $\phi_{XB}(7)=|\Xi_{XB}(7)|A_{XB}=1\cdot A_{XB}=A_{XB}$.

Next, it is shown how this message from active element $E_X$ passes through active element $E_B$. Assume that the firing time s is 2 and that the transmission time $\tau_{XB}$ is 5, at time t=9, t-s-$\tau_{XB}$=9-2-5=2, which is the length of the message width, $\omega_{XB}$. In other words, time t=9 the message from active element $E_X$ "exits" or "passes through" active element $E_B$. Consequently, $\Xi_{XB}(9)=\{2\}$ because the firing time is 2, and t-s-$\tau_{XB}$ lies in the interval [0, $\omega_{XB}$]. Since t-s-$\tau_{XB}$=9-2-5=2, which lies in the interval [0, 2], therefore, $\Phi_{XB}(9)=A_{XB}$.

At, a small amount of time after the boundary condition t=9, for example at t=9.01 the function $\Xi_{XB}(9.01)=\emptyset$, because t-s-$\tau_{XB}$ does not lie in the interval [0, $\omega_{XB}$]. Specifically, the value of t-s-$\tau_{XB}$ is given by t-s-$\tau_{XB}$=9.01-2-5=2.01, and 2.01 does not lie in [0, 2]. Therefore, $\Phi_{XB}$(9.01)=0.

EXAMPLE 3

Suppose that two incoming messages from active element $E_X$ and active element $E_Y$ arrive at active element $E_B$ at different times. Suppose active element $E_X$ fires at s=2, the value of $\tau_{XB}$=5 and the message width $\omega_{XB}$=2. Assume that the message amplitude $A_{XB}$=4. Assume also that Active element $E_Y$ fires at s=2. Assume that the transmission time from active element $E_Y$ to $E_B$ is $\tau_{YB}$=7.5, and the message width $\omega_{YB}$=2. The message amplitude from active element $E_Y$ to $E_B$ is $A_{YB}$=-2. The analysis of the input function $\Phi_{XB}$(t) is performed in example 1, above. In that analysis, it was found that $\Phi_{XB}$(t)=0 when t<7. Also, $\Phi_{XB}(t)=A_{XB}$=4 when 7≦t≦9 and $\Phi_{XB}$(t)=0 when t>9.

Using a similar analysis on $\Phi_{YB}$(t), it is found that $\Phi_{YB}$(t)=0 when t<9.5. $\Phi_{YB}(t)=A_{YB}$=-2 when 9.5≦t≦11.5 and $\Phi_{YB}$(t)=0 when t>11.5. Suppose the time that active element $E_B$ last fired is t=2, so $\psi_B$(7)=2, because the value of $\psi_B$(7) is the time that the active element $E_B$ last fired. Suppose the refractory period of active element $E_B$ is $r_B$=4 and the threshold $\Phi_B$=3.

To determine when active element $E_B$ fires, $g_B$(t)=1 if $\Phi_{XB}(t)+\Phi_{YB}(t)>\theta_B$ and t≧$\psi_B(t)+r_B$; otherwise, $g_B$(t)=0. Thus, $g_B$(t)=0 when t<7 because $\Phi_{XB}(t)+\Phi_{YB}$(t)=0+0<3. At time t=7, $\Phi_{XB}(7)+\Phi_{YB}$(7)=4+0>3. Also, the time last fired is $\psi_B$(7)=2, and the refractory period $r_B$, so t≧$\psi_B(7)+r_B$=2+4. Thus, $g_B$(7)=1. At time t=7.0001, the function $\psi_B$ has the value $\psi_B$(7.0001)=7, and the refractory period is $r_B$=4, so t=7.0001<7+4. Thus, $g_B$(7.0001)=0. At time t=9, it follows that $\psi_B$(9)=7, and $r_B$=4 so t<$\psi_B(t)+r_B$. Thus, $g_B$(9)=0. At time t=9.5, the sum of the input functions is given by $\Phi_{XB}(t)+\Phi_{YB}$(t)=0+-2<3. Thus, $g_B$(9.5)=0. At time t=11.5, the sum of the input functions is given by $\Phi_{XB}(t)+\Phi_{YB}$(t)=0+-2<3. Thus, $g_B$(11.5)=0. Overall, since $g_B$(7)=1, active element $E_B$ fires once at time s=7.

Firing Representations

Consider active element $E_i$'s firing times F($E_i$)={s: $g_i$(s)=1}. If $E_i$'s refractory period is greater than zero, arrange the elements of the set F($E_i$) into a sequence [$s_0, s_1, s_2, \ldots$], where $s_0<s_1<s_2<\ldots$. Consider the interval of time W=[$t_1, t_2$], which starts at and includes time $t_1$, and ends at and includes time $t_2$. Let $s_m$ be the smallest element lying in W, and $s_n$ the largest element lying in W. Then $E_i$'s firing sequence within the window of computation W is F($E_i$;W)=[$s_m, s_{m+1}, \ldots, s_n$], where $s_m<s_m+1<\ldots<s_{n-1}<s_n$ and $$\bigcup_{k=m}^{n} \{s_k = s \in W: g_i(s) = 1\}.$$

In other words, the sequence of times [$s_m, s_{m+1}, \ldots, s_n$] are the set of times within W for which $g_i$(s)=1 and active element $E_i$ fired. The sequence $F(E_i;W)$ may be called a firing representation of the active element $E_i$ over the interval of time W. With a collection of active elements $\{E_0,E_1,E_2,\ldots\}$, one can create the infinite tuple $(F(E_0,W), F(E_1,W), F(E_2,W), \ldots)$. The infinite tuple $(F(E_0,W), F(E_1,W), F(E_2,W), \ldots)$ may be called a firing representation of the set of active elements $\{E_0,E_1,E_2,\ldots\}$ over the window of computation W. At a fundamental level of interpretation, firing representations may be used to express the input to, the computation of, and the output of a machine of active elements. At a more abstract level, the firing representations can be represented by an input symbol, an output symbol, a sequence of symbols, a number, or even a sequence of program instructions.

Example of a Firing Representation

For each real number x within the interval [0, 1], one can construct a distinct firing representation of active elements $\{E_0,E_1,E_2,\ldots\}$ over a finite interval of time. For example, let $\gamma>0$ be a finite real number. Choose the interval of time for each active element to be $[0, \gamma]$. For any time $t<0$, there are no restrictions on when active elements $E_i$ fired. With this in mind, for each index i, choose the refractor period $r_i=\gamma$ and suppose the last time fired is $\psi_i(0)=-\gamma$, so that it is possible for active element $E_i$ to fire or to not fire during the interval of time $[0, \gamma]$. Let the sequence $(b_0, b_1, b_2, b_3 \ldots)$ be a binary representation of a real number x in [0, 1]. If $b_i=1$, then choose $E_i$ to fire once during the interval of time $[0, \gamma]$. If $b_i=0$, then choose $E_i$ to not fire during the interval of time $[0, \gamma]$. Thus a set of active elements can be used to represent a number, which shows the existence of a firing representation for x.

Sequence of Firing Representations

Let $C=\{E_0,E_1,E_2,\ldots\}$ denote a collection of active elements. Also, let $W_1,W_2,W_3,\ldots,W_n$ be a sequence of time intervals. Let $F(C; W_1)=(F(E_0, W_1), F(E_1, W_1), F(E_2, W_1), \ldots)$ be a firing representation over the interval $W_1$. Let $F(C; W_2)=(F(E_0, W_2), F(E_1, W_2), F(E_2, W_2), \ldots)$ be a firing representation of the active elements $\{E_0,E_1,E_2,\ldots\}$ over the interval of time $W_2$. In general, let $F(C,W_i)=(F(E_0, W_i); F(E_1, W_i); F(E_2, W_i), \ldots)$ be the firing representation over the interval of time $W_i$. From these one can create a sequence of firing representations, $F(C, W_1), F(C, W_2), F(C, W_3), \ldots F(C; W_n)$.

Machine Computations

Let $F(C, W_1), F(C, W_2), F(C, W_3), \ldots F(C, W_n)$ denote a sequence of firing representations. Let $F(C, S_1), F(C, S_2), F(C, S_3), \ldots F(C; S_n)$ be a sequence of firing representations. If there exists a machine architecture for a machine (1) whose input elements can be represented with a sequence of firing representations $F(C, S_1), F(C, S_2), F(C, S_3), \ldots F(C; S_n)$, and (2) generates with its output elements the sequence of firing representations $F(C, W_1), F(C, W_2), F(C, W_3), \ldots F(C; W_n)$, then one says that the machine computes $F(C, W_1), F(C, W_2), F(C, W_3), \ldots F(C; W_n)$.

A Machine Represented by Firing Representation

A machine is an interpretation between two sequences of firing representations if the machine can compute the output sequence of firing representations from the input sequence of firing representations. When using a dynamic machine, it is possible to use a distinct machine architecture for each distinct sequence of firing representations.

A Static Program

Let M(J, C, D) denotes a machine, where M may be a static machine or a dynamic machine. Then a static program is a sequence of firing representations presented to M(J, E, D)'s input elements, J.

A Meta Program

A meta-program determines how to change a dynamic machine's architecture as it executes. In an embodiment, a meta program is executed in which the instructions of the meta program change the connections between the active elements in the computing machine. Let M(J, C, D) denote a dynamic machine. For each j, let the symbol $x^j$ be used to represent a number, which may be any of A, $\omega$, $\tau$, representing a message amplitude, a message width or a transmission time, respectively.

In an embodiment, a meta-program may be represented by a finite sequence of quintuples $[(x,^1,k_1, i_1,v_1\, t_1); (x^2, k_2, i_2, v_2, t_2), \ldots, (x^n, k_n, i_n, v_n, t_n)]$ where each $t_i$ represents a time and $t_i<t_2<\ldots<t_n$. In other words, the sequence of quintuples is arranged in time order. For each j, where $1\leq j\leq n$, the quintuple, $(x^j,k_j, i_j,v_j,t_j)$, instructs M(J,C,D) to assign the value $v_j$ to connection element, $x^j_{k_j i_j}$, at time $t_j$. In particular, at time $t_1$, connection element, $x^1_{k_1 i_1}$, is assigned the value $v_1$. If $x^1$ is the symbol A, then message amplitude $A^1_{k_1 i_1}$, is assigned the value $v_1$, at time $t_1$. Similarly, at time $t_2$, connection element, $x^2_{k_2 i_2}$, is assigned the value $v_2$. If $x^2$ is the symbol $\omega$, then message width $\omega_{k_2 i_2}$ is assigned the value $v_2$ at time $t_2$. Changing the connections between active elements while executing a set of instructions, enables the active element machine to perform tasks that digital computers are unable to perform.

Example of Programming an Active Element Machine

A program for a machine may be represented as a set of pairs of numbers each pair including a time and an identification numbers identifying one of the active elements of a machine. Each pair of numbers specifies a time when a given active element should fire. An example of a simple static program is

| Machine Program | |
|---|---|
| Time | Input element |
| 0 | 0 |
| 5 | 0 |
| 11 | 0 |

The first line of this Static program has 0 in the time column and 0 in the input element column. The first line instructs that input element 0 to fire at time 0. The second line has a 5 in the time column and a 0 in the input element column. Thus, the second line instructs input element 0 to fire at time 5. The last instruction is on the third line, which instructs that input element 0 to fire at time 11. The above example of a program helps illustrate how a static program may be interpreted by a static machine. Longer more complex static programs can also be executed with machine.exe. The program may be run simultaneously with a meta program in a dynamic machine.

A program for a machine may be represented as a set of pairs of numbers each pair including a time and an identification numbers identifying one of the active elements of a machine. Each pair of numbers specifies a time when an output element fired and the identification number of the output element that fired. An example of output from a machine may be

| Machine Program Output | |
|---|---|
| Time | Output element |
| 3.00 | 0 |
| 4.00 | 0 |
| 5.00 | 0 |
| 6.00 | 0 |

-continued

Machine Program Output

| Time | Output element |
|------|----------------|
| 7.00 | 0 |
| 8.00 | 0 |
| 9.00 | 0 |

The first line of this static program has a 3.00 in the time column and 0 in the output element column. The first line means that output element 0 fired at time 3.00. The second line of this output has a 4.00 in the time column and 0 in the output element column. The second line means that output element 0 fired at time 4.00. The rest of the lines in the above example are interpreted in a similar way.

In this embodiment, the output has the same format as the input file. Consequently, the output of one machine can be used as a static program for another machine. This enables one to compose the results of one or more machines. Using machine composition, a programmer can program a complex task with many small machines that perform simpler tasks. In an alternative embodiment, the input and output files may have different formats so that they are not confused with one another. In another embodiment, the programmer may have a choice whether the input and output programs have the same format.

Nand Function Example

It is well-known that any Boolean function or circuit can be constructed from a composition of one or more NAND functions, [Enderton]. The following table shows the definition of a NAND Boolean function, where |—the Sheffer stroke—represents the NAND binary operator.

| B | C | B\|C |
|---|---|------|
| 0 | 0 | 1 |
| 0 | 1 | 1 |
| 1 | 0 | 1 |
| 1 | 1 | 0 |

In this example, we use four active elements to build a circuit that computes the equivalent of a NAND function. Active elements B and C are the inputs; active elements H and L represent the output. When 0 is input into both B and C or when the input to one of active elements B and C is 1 and the input to the other of active elements B and C is 0, active element H fires and active element L does not fire, corresponding to the first three rows of the truth table for B|C=1. When the inputs to active elements B and C are both 1, active element L fires and active element H does not fire, corresponding to the last row of the truth table for B|C=0. With this correspondence in mind, the values in the following table represent the message amplitude, message width and transmission time from active element B to active element L.

|  | Message Amplitude $A_{BL}$ | Message Width $\omega_{BL}$ | Transmission Time $\tau_{BL}$ |
|---|---|---|---|
| From active element B To active element L | 2 | 1 | 1 |

Similarly, the values below represent the message amplitude, message width and transmission time from active element C to active element L.

|  | Message Amplitude $A_{CL}$ | Message Width $\omega_{CL}$ | Transmission Time $\tau_{CL}$ |
|---|---|---|---|
| From active element C To active element L | 2 | 1 | 1 |

Similarly, the values below represent the message amplitude, message width and transmission time from active element B to active element H.

|  | Message Amplitude $A_{BH}$ | Message Width $\omega_{BH}$ | Transmission Time $\tau_{BH}$ |
|---|---|---|---|
| From active element B To active element H | −2 | 1 | 1 |

Similarly, the values below represent the message amplitude, message width and transmission time from active element C to active element H.

|  | Message Amplitude $A_{CH}$ | Message Width $\omega_{CH}$ | Transmission Time $\tau_{CH}$ |
|---|---|---|---|
| From active element C To active element H | −2 | 1 | 1 |

Set the refractory period of elements H and L to 2, in other words, $r_L=r_B=2$. Set the threshold of L to 3, in other words, $\theta_L=3$. Set the threshold of H to −3, in other words, $\theta_H=-3$. We assume the time last fired for effectors H and L is t=−1.

Finally, all four possible inputs are analyzed.

Case 1.) At time t=0, both active elements B and C, do not fire, corresponding to B|C=0|0. At time t=1, the refractory period of H and L has expired. At time t=1 the input to H is zero, so H fires because the input is greater than its threshold $\theta_H=-3$. At time t=1 the input to L is zero, so L does not fires because the input is less than its threshold $\theta_L=3$.

Case 2.) At time t=0, active element B fires and active element C does not fire, corresponding to B|C=0|1. At time t=1, the refractory period of H and L has expired and the pulse from B has arrived. At time t=1, the input to H is −2 because $A_{BH}=-2$. Thus, H fires because its input is greater than its threshold $\theta_H=-3$. At time t=1, the input to L is 2 because $A_{BL}=2$. Thus, L does not fire because its input is less than its threshold $\theta_L=3$.

Case 3.) At time t=0, active element B does not fire and active element C fires, corresponding to B|C=1|0. At time t=1, the refractory period of H and L has expired and the pulse from C has arrived. At time t=1, the input to H is −2 because $A_{CH}=-2$. Thus, H fires because its input is greater than its threshold $\theta_H=-3$. At time t=1, the input to L is 2 because $A_{CL}=2$. Thus, L does not fire because its input is less than its threshold $\theta_L=3$.

Case 4.) At time t=0, active element B fires and active element C fires, corresponding to B|C=1|1. At time t=1, the refractory period of H and L has expired and the pulses from B and C have arrived. At time t=1, the input to H is −4 because $A_{BH}+A_{CH}=-4$. Thus, active element H does not fire because its input is less than its threshold $\theta_H=-3$. At time t=1, the input to L is 4 because $A_{BL}+A_{CL}=4$. Thus, active element L fires because its input is greater than its threshold $\theta_L=3$.

In summary, an AND operation is obtained by having an output active element, which in the above example is active element L, that does not fire unless the sum of inputs of two input active elements, which in the above example are active elements B and C, is greater than a set threshold. The negation of the digital operation AND, called NAND, may be obtained by changing the signs of both the amplitudes and the threshold, without changing the other parameters. A NAND operation in the above example may be represented by active element H, or it may represented by the collective behavior of both H and L.

Input and Output Interpreter

There are at least two different methods of programming a machine. In the first method, called explicit programming, someone explicitly designs a machine architecture, and writes a static program or meta program. The design of a machine architecture and a program, using explicit programming, were explained above. Despite the fact that machine instructions for a machine of active elements may be quite different from a digital computer's machine instructions, explicit programming is analogous to writing a computer program in assembly language, C, or some other programming language for a digital computer.

A second method, called implicit programming, designs the architecture and programs of a machine based on the desired machine behavior. A method for implicit programming is presented in the next section.

In both explicit programming and implicit programming, the use of an Input Interpreter and Output Interpreter may simplify the programming task. In any programming endeavor, the task that needs to be solved, performed, or finished can be represented mathematically by an (input, output) set of pairs, $\{(I_1,O_1),(I_2,O_2),\ldots\}$. In some cases, the set, $\{(I_1,O_1),(I_2,O_2),\ldots(I_n,O_n)\}$, is finite. In other cases, it can be infinite. For each i, $I_i$ is the input point, and $O_i$ is the corresponding output point. The (input, output) set specifies the behavior of the machine that is to be designed. An input and output interpreter translates a chosen pair $(I_i,O_i)$ to the native machine instructions of the machine. Specifically, the input interpreter translates the point $I_i$, into a sequence of firing activities executed by the input active elements, J. The output interpreter translates the firing activity of the output active elements, D, into an output point, $O_i$. This output point represents the output of the machine. For example, the input points may represent hand written letters of the alphabet, and the output points may represent an identification of the letter.

An input interpreter and output interpreter may be designed with C++ source code and can change, depending on what the machine is designed to do. Also, an input interpreter can be implemented as a distinct machine. Likewise, an output interpreter can be implemented as a distinct machine. Alternatively the same machine may be used as both the input and output interpreter or the machine performing the computations may perform its own input and/or output interpretation.

Evolutionary Design of an Active Element Machine

Implicit programming on an active element machine can be accomplished using evolutionary methods. Evolutionary methods for extremely different applications were first introduced by [Box], [Bledsoe], [Bremermann], and [Friedman]. Implicit programming is preferable to explicit programming when the programmer knows what she wants the active element machine to accomplish, but she does not know how to explicitly design the active element machine architecture, static program or meta program. This is analogous to a CEO of a company asking her engineers to build a new computer, but she does not know how to build this computer. The CEO knows how she wants the computer to behave, but does not know how to explicitly build it.

The symbol $\Theta$ represents an optimal fitness value. As an example, a fitness value may be the percentage of input/output pairs correctly computed, called the computing accuracy. In some applications, computing speed and the number of active elements used, may be important, so the fitness value may be a weighted average of the speed, number of active elements, and computing accuracy. For example, the weighting may be 40% computing accuracy, 30% speed and 30% number of elements. In other words, if a machine has a fitness value greater than $\Theta$, then it can competently compute the (input, output) set of pairs, $\{(I_1,O_1),(I_2,O_2),\ldots\}$. The fitness of $M_j$ is determined by its overall ability to represent, $O_i$, with its output active elements, after $M_j$'s input active elements receive input $I_i$. The fitness may also dependent on the amount of memory $M_j$ consumes, the average amount of computational time that it takes to compute the outputs $M_j$, and/or the amount of other resources consumed by $M_j$. A smaller amount of memory, computational time, and/or other resources consume increases the fitness.

Directed Graph

A machine may be represented by a directed graph in which the vertices represent active elements, and the lines connecting the vertices (referred to as edges) indicate which active elements are capable of sending messages to which other active elements.

FIG. 2 shows two directed graphs. In a directed graph diagram, a dot represents a vertex. A line segment with one arrow pointing from one vertex to the other vertex represents a directed edge. Plot 202 of FIG. 2 is a graph that contains a cycle. A cycle is formed when it is possible to follow the line segments in the direction of the arrows back to the starting point. Plot 204 is another directed graph that does not contain a cycle so it is called a tree.

A useful analogy is that the structure of hyperlinks on the World Wide Web is a directed graph because it is possible to click on a link to go to web page A, by clicklng on a link while at web page B, but not vice versa. In mathematical language, a line segment connected from B pointing to A may be written as (B,A), which is called an edge in the directed graph. However, in this example (A,B) is NOT an edge, because the line connecting A and B points to A and does not point to B.

Let $V=\{v_1,v_2,\ldots,v_n\}$ be a finite set of n vertices. An edge in a directed graph is an ordered pair $(v_1,v_j)$ with each vertex lying in V. Let $E=\{(v_{i1},V_{k1}),(v_{i2},V_{k2}),\ldots,(v_{im},V_{km})\}$ be a finite set of edges. A directed graph is formally, $G=(V,E)$, where E and V have just been defined. A machine including active elements can be represented by a directed graph. Each edge may represent a connection between two active elements (which are represented by the vertices).

Cyclic Graph Evolution

There are many methods of improving the fitness of a machine, which include deterministic and probabilistic methods. An advantage of using a probabilistic method is the search for an improved machine extends over a larger space. Probabilistic methods are less likely to improperly identify a local extremum (a minimum or maximum) as a global extremum, and can therefore obtain often obtain better fitnesses. On example of a method of improving the fitness is Cyclic Graph Evolution, which will be abbreviated with the letters, CGE. CGE may be performed in any of a number of ways. In one embodiment, CGE may be used to design at least one machine that competently computes the collection of (input, output) pairs, $\{(I_1,O_1), (I_2,O_2), \ldots (I_n,O_n)\}$. In an embodiment, first an initial generation of machines, $A=\{M_O, M_1, M_2, \ldots M_m\}$ is built. In an embodiment, the number m represents the number of machines in each generation of the evolutionary process. In other words, the evolutionary process may involve the construction of a set of m machines. Each of the machines is varied in order to find a machine with an adequate fitness. There are many possible methods of varying the machines.

In one embodiment, two methods of varying machines are used, which are permutation and mutation. During permutation, one or mores sets of one or more components (e.g., active elements) of one machine are switched with other components. In one type of permutation, which will be referred to as a crossover, the components are switched with one more components of another machine. Permutations, such as crossovers increase the complexity and variety of machines searched when looking for a machine with a better fitness. During a permutation, one or more parameters are altered without there necessarily being any relationship to parameters altered in another machine. For example, the value of any one of, or any combination of, an amplitude, message width, transmission time, threshold, and/or refractory period may be changed. In an embodiment, an active element and/or connection may be added or removed. In different embodiments different sets of these parameters may be varied during a mutation or permutation.

In an embodiment, after constructing a set of machines, the fitness of each machine, $M_j$ is determined. Then the following is performed multiple times: CGE randomly chooses two machines for possible crossover and mutation, from the current generation based on their fitness. As an example, if one machine, $M_1$, has a fitness of 74% and another machine, $M_2$, has a fitness of 90%, then $M_2$ is more likely to be chosen for the next generation. However, since the machines are chosen randomly, it is still possible for $M_1$ to be chosen for the next generation, but not $M_2$. Sometimes the two machines selected are crossed over and/or mutated. The choice of whether to perform a mutation, and/or whether to perform a mutation may be made randomly. For example these choices may based on a random number selection. After a possible crossover and mutation, these two machines are placed in the next generation. The selection of two machines, and possible crossover and mutation is repeated until the next generation has m machines. CGE is repeated until the best machine $M_{best}$ has a fitness greater than $\Theta$. The CGE design process is presented below as an algorithm.

An Example of an Algorithm for Performing CGE to Design an Active Element Machine An example of psuedocode for designing machines via CGE is as follows. Build an initial population of machines, $A=\{M_0, M_1, M_2, \ldots M_m\}$.

```
while(true)
{
    Set G equal to the empty set. (G stores the machines in the next
    generation.)
    For each j in {1, 2, 3,...,m}
    {
        For each i in {1, 2, 3,...,n}
        Find M_j's overall ability to represent, O_i, with its output active
            elements, after M_j's input active elements receive input I_i.
        Store this ability as the fitness of M_j.
    }
    Set q equal to the number of machines with fitness greater than Θ.
```

```
If q ≥ 1, exit the loop while(true) and return M_best, the machine with
    the highest fitness.
while( the size of G < m)
{
    Randomly choose two machines, M_j, M_k, from A for the next
    generation.
    (The probability of choosing M_j is proportional to its fitness.)
    Randomly choose a number r between 0 and 1.
    If r < p_crossover, then crossover machines M_j and M_k.
    Randomly choose numbers s_1 ; s_2 between 0 and 1.
    If s_1 < p_mutation, then mutate machine M_j.
    If s_2 < p_mutation, then mutate machine M_k.
    Set G equal to G U {M_j, M_k}.
}
Set A equal to G.
}
```

In the above program, the symbol $P_{crossover}$ denotes the probability that two machines chosen for the next generation will be crossed over (e.g., have modules interchanged). Also, the symbol $P_{mutation}$ denotes the probability that a machine will be mutated (e.g., have a change made to one of the machines parameters). In an embodiment, the parameters $P_{crossover}$, $P_{mutation}$, and m are input by a user at the start of running the CGE. In an embodiment, if a set of mutations and crossovers for a given machine do not result in a machine with the same fitness or a higher fitness than the initial fitness, then the mutation is not performed. Optionally, a different set of mutations and crossovers are chosen. In an embodiment, after making each mutation or crossover, a determination is made as to what fitness results, and if the fitness is lower the mutation or crossover is not made. Optionally, if the fitness is lower a different mutation or crossover is performed. Optionally, a random number may be chosen to see if another mutation or crossover is performed.

Constructing an Initial Set of Machines

Figure 3:
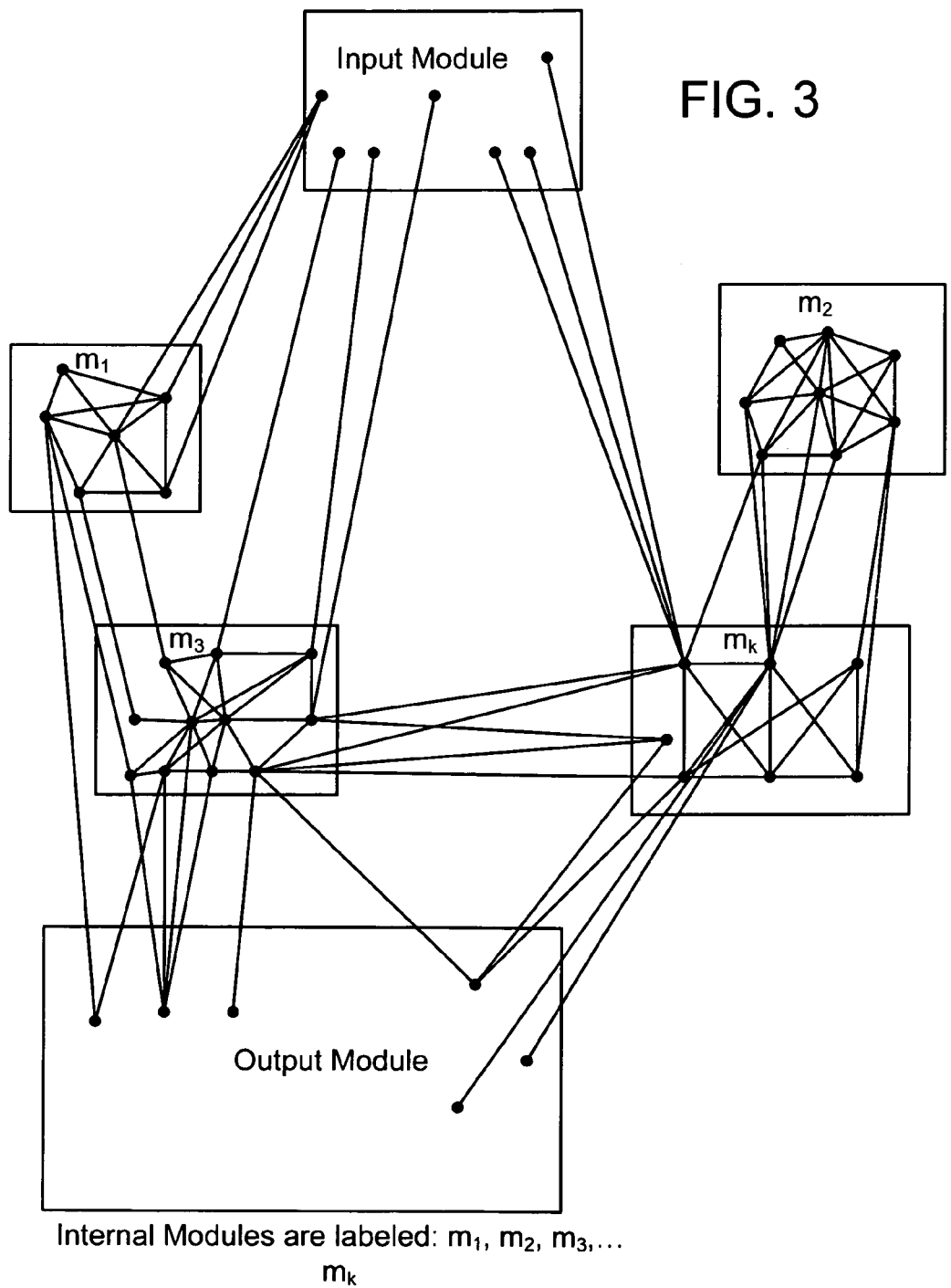
FIG. 3 shows an example of a machine in which the active elements are divided into modules to facilitate cyclic graph evolution.

FIG. 3 shows an example of a machine in which the active elements are divided into modules to facilitate cyclic graph evolution, which is an example of some further details of the construction of the machines in the initial population. Each machine may be constructed separately. Each machine that is designed by cyclic graph evolution may be composed of an Input Module, an Output Module, and one or more Internal Modules, such as $m_1, m_2, m_3, \ldots m_K$, as illustrated in FIG. 3. In an embodiment, every active element lies in exactly one module. The manner in which the active elements are organized into modules does not affect how the machine computes. However, as explained below, the manner in which the active elements are organized into modules may affect how two machines are created for CGE, crossed over, and mutated. A non-zero connection between two active elements lying in two distinct modules is called an external connection. A non-zero connection between two active elements lying in the same module is called an internal connection.

For each machine created, an Input Module and an Output Module are created. Further, a random number k may be chosen such that MIN_MODULES_PER_MACHINE≦k≦MAX_MODULES_PER_MACHINE, and k internal modules are created. In other embodiments, the initial number of internal modules in a machine may be chosen in a different manner. For example, in an embodiment the number of initial internal modules may be chosen based on the number of computations that are expected to be required to perform a desired task. In another embodiment, the number of internal modules chosen may be a fixed number.

Each module is constructed separately. External connections are added afterwards. For each module, a random number u may be chosen such that MIN_ACTIVE_ELEMENTS_PER_MODULE≦u≦MAX_ACTIVE_ELEMENTS_PER_MODULE. Next, u active elements are created. In other embodiments, the initial number of active elements in a module may be chosen in a different manner. For example, in an embodiment the number of initial active elements may be chosen based on the number of computations that are expected to be required to perform a desired task. In another embodiment, the number of active elements chosen may be a fixed number for a given machine or a fixed number for all machines. In another embodiment, there may be a fixed set of numbers in which each number represents the initial number of active elements in a module within a given initial machine.

For each active element, the refractory period may be randomly chosen between MIN_REFRACTORY_PERIOD and MAX_REFRACTORY_PERIOD. For each active element, the threshold may be randomly chosen between MIN_THRESHOLD and MAX_THRESHOLD. In other embodiments, the initial thresholds may be chosen in a different manner. For example, in an embodiment the value of an initial threshold may be chosen based on the number of initial input connections and/or type of computations that are expected to be required to perform a desired task. In another embodiment, the value of the initial thresholds may be chosen to be a fixed number. In an embodiment, the value of the initial thresholds may be chosen to be the same number for an entire module, for an entire machine and/or for all machines. In another embodiment, there may be a fixed set of thresholds in which each threshold represents the initial threshold of a given active element.

Next, for each active element, a random number v is chosen such that MINIMUM_CONNECTIONS≦v≦MAXIMUM_CONNECTIONS. This means that v connections are created for this particular active element. In other embodiments, the initial connections may be chosen in a different manner. For example, in an embodiment the number of initial connections may be chosen based on the number and/or type of computations that are expected to be required to perform a desired task. In another embodiment, the number of connections chosen may be a fixed number. In an embodiment, the number of the initial connections may be chosen to be the same number for an entire module, for an entire machine and/or for all machines. In another embodiment, there may be a fixed set of numbers in which each number represents the initial number of connections to a given active element.

For each of these v connections, the initial value of the message amplitude may be randomly chosen between MIN_AMPLITUDE and MAX_AMPLITUDE, inclusive. For each connection, the value of the message width is randomly chosen between MIN_MESSAGE_WIDTH and MAX_MESSAGE_WIDTH, inclusive. In other embodiments, the message widths may be chosen in a different manner. For example, in an embodiment the message widths may be chosen to have a fixed initial value. In an embodiment, all of the initial message widths may be chosen to be the same. In an embodiment, the value of the initial message widths may be chosen to be the same number for an entire module, for an entire machine and/or for all machines. In another embodiment, there may be a fixed set of numbers in which each number represents the initial message width of a given active element.

For each connection, the initial transmission time is randomly chosen between MIN_TRANSMISSION_TIME and MAX_TRANSMISSION_TIME, inclusive. In other embodiments, the initial transmission times may be chosen in a different manner. For example, in an embodiment the transmission time may be chosen to have fixed set of initial values. In an embodiment, all of the initial transmission times within a given module or machine may be chosen to be the same.

An Example of a Crossover

FIG. 4 shows an example of how CGE executes a crossover between two machines, machine A and machine B. The variable $n_1$, represents the number of internal modules in the machine A, and the variable $n_2$ represents the number of internal modules in machine B. For machine A, a random whole number $j_1$ is chosen, lying between LOWER_FRACTION_NUM_MODULES*$n_1$ and UPPER_FRACTION_NUM_MODULES* $n_1$. For machine B, a random whole number $j_2$ is chosen, lying between LOWER_FRACTION_NUM_MODULES * $n_2$ and UPPER_FRACTION_NUM_MODULES * $n_2$. In FIG. 4, for machine A, $j_1$=2 was selected. For machine B, $j_2$ =1 was selected. Since $j_1$=2, two distinct numbers are chosen randomly from the set $\{1, 2, \ldots, n_1\}$. In the example of FIG. 4, for machine A, these two numbers were chosen as 2 and 3. Since $j_2$=1, one number is randomly chosen from $\{1, 2, \ldots, n_2\}$. In the example of FIG. 4, the number 2 was chosen. Based on the above choices, internal modules $m_2$ and $m_3$ of Machine A are crossed over (e.g., switched) with internal module $m_2$ of Machine B. All the external connections to these modules are also severed.

In FIG. 4, after the crossover, new external connections are created and added to the internal modules that were crossed over. In an embodiment, internal connections in a module that is crossed over are not changed or severed as part of the crossover. In another embodiment, internal connections may be altered after and/or during the crossover.

More About Mutations

This part further discusses mutations of a Machine. There are multiple ways to mutate a machine. An active element can be added to a module along with some non-zero connections, connecting the new active elements to active elements inside the same module, and possibly connecting the active element to active elements in different modules. A second type of mutation deletes an active element. Any non-zero connections are removed that connect to the active elements being deleted. A third type of mutation may change the message amplitude, message width, and/or the transmission time of a connection. Similar to adding an active element, a fourth type of mutation adds a new connection to an active element. Similar to removing an active element, a fifth type of mutation removes a connection from a machine.

A sixth type of mutation creates a new module containing new active elements and connections between them and connects this new module to other modules with new external connections. A seventh type of mutation deletes a module and removes all of the deleted module's external connections.

In one embodiment, $p_{crossover}$ should usually range from 0.3 to 0.7. Also, in one embodiment $p_{mutation}$ should usually be less than 0.1. In other embodiments, $p_{crossover}$ and/or $p_{mutation}$ may have other values. Previous evolutionary methods evolve directed graphs that contain no cycles. CGE is the first evolutionary method to evolve directed graphs containing cycles. Including cycles in the directed graph of a machine may facilitate the performance of tasks that require the use of an iterative process. It is also the first evolutionary method that is capable of performing crossovers and mutations on these directed graphs containing cycles.

In previous evolutionary methods, each vertex represents a static function. The directed edge represents output from one function delivered as input to the other function. Because of this structure, information does not flow in the opposite direction. Furthermore in a function, the output cannot be computed until it receives the input. Consequently, information flows in a synchronized way. On the other hand, the objects that CGE operates on (e.g., the active elements) are entirely different. Active elements may have more structure, more flexibility, and more computing capability than functions. Each vertex may represent one active element, and each directed edge may represent a non-zero connection between active elements. Furthermore, it is also possible to have a non-zero connection between two active elements, so information may flow asynchronously in both directions. Since active elements can change over time, active elements can mimic the behavior of an infinite number of functions.

Designing a VLSI

CGE can be used to design analog VLSI circuits which are suitable for implementing machines in hardware. One of Mead's primary methods of designing subthreshold analog circuits, [MEAD], is to use piecewise linear analysis to design non-linear circuits. Piecewise linear analysis becomes difficult as the size of the circuit increases. Also, piecewise linear analysis often requires a person to come up with clever techniques for predicting how the nonlinear circuit will behave. In other words, it is very difficult to write a computer program that can automate the design of circuits representing machines, using piecewise linear analysis; it also may increase the time and financial cost of designing machines. CGE does not require cleverness. One can treat the analog VLSI circuit as a black box. Only a set of inputs $\{I_1, I_2, \ldots I_n\}$ and a corresponding set of outputs $\{O_1, O_2, \ldots, O_n\}$, are required of the analog VLSI circuit. Then execute CGE on the (input, output) set, $\{(I_1, O_1), (I_2, O_2), (I_3, O_3), \ldots\}$. The machine that results from the execution of CGE can be used as the VLSI circuit desired.

Hardware Implementation of Active Elements

This section addresses the implementation of a machine in hardware; an example is a semiconductor chip. In a hardware implementation of a machine, computation still can be robustly executed even though there may be a small amount of variance in the transmission time or the exact time an active element is supposed to fire. The analysis below explains how to design an active element machine despite substantial variance in the physical parameters of the hardware.

Let r denote the refractory period of an active element. Let $t_{detect}$ denote the time at which active element $E_i$ detects that some other active element has fired. Let $t_{actual}$ denote the actual time that this other active element fired. To simplify the analysis, ignore the transmission time from the active element that fired to the active element that received the message fired. Let $\epsilon_i$ denote the maximum possible value for $|t_{detect} - t_{actual}|$ in active element $E_i$. Define $\epsilon = \max\{\epsilon_i: E_i$ is an active element in machine M$\}$. If $\epsilon_i = 0$, then all active elements detect when another active element has fired with perfect precision. Let T denote a finite interval of time such that the hardware obeys $0 < \epsilon < r < T$.

Figure 5:
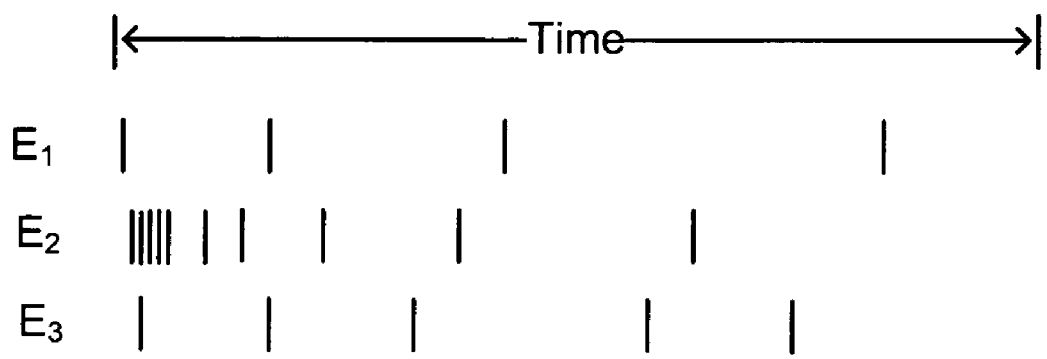
FIG. 5 shows a graph of an example of a set of firing times for a set of active elements.

FIG. 5 shows error tolerance of an embodiment of an active element. Define $\chi$:

$$N \times N \to N \text{ as } \chi(L; n) =$$

$$L * (L-2) * (L-4) \ldots * (L-2n+2) = \prod_{k=1}^{n} (L-2k+2).$$

As an example, $\chi(7, 3) = 7*5*3$. As another example, $\chi(20, 5) = 20*18*16*14*12$. Choose T so that r divides T with zero remainder.

In this example, the formula:

$$\sum_{n=1}^{\frac{T}{r}} \frac{\chi\left(\frac{T}{r}, n\right)\left(\frac{r}{\epsilon}\right)^n}{n!}$$

is the maximum number of possible distinct firing configurations for an active element, during the interval of time T. This number of firing configurations determines the number of different states that the active element could be in during this time period.

Figure 6:
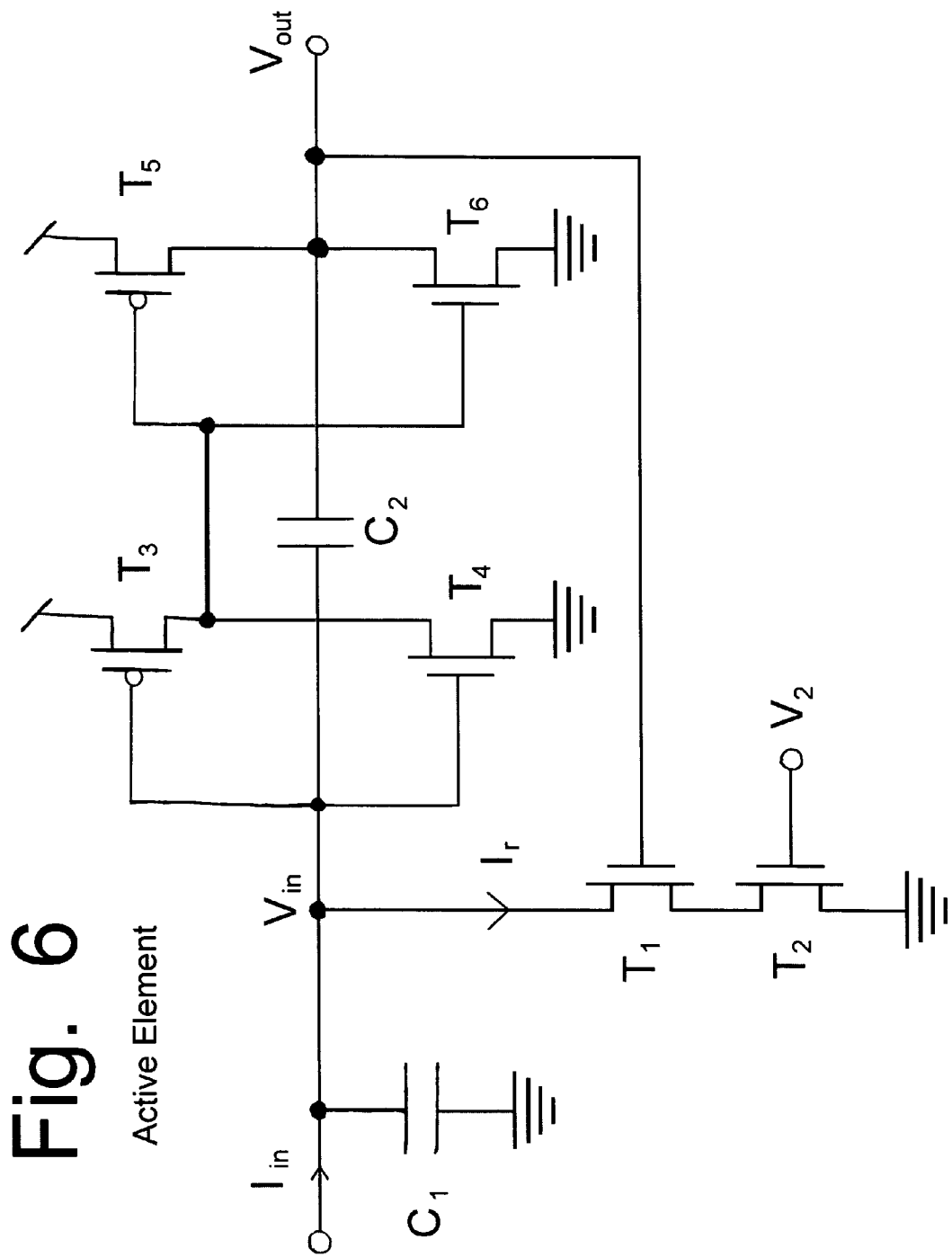
FIG. 6 shows an example of a circuit diagram of an active element.

FIG. 6 shows a schematic diagram of an embodiment of a circuit of an active element. The computing machine, which may be referred to as an Active element machine, can be implemented in hardware and built from a variety of different components. For example, the computing machine may be built from circuits of transistors that operate subthreshold. FIG. 6 illustrates how transistors operating at subthreshold can be used to implement an active element.

In FIG. 6, transistors are denoted with the symbol T; capacitors are denoted with the symbol C; the voltage at a particular location is denoted with the symbol V; and the current is denoted with the symbol I and an adjacent arrow. The subscripts help further describe or distinguish components.

Regarding the firing of the active element, in FIG. 6, the four transistors, $T_3$, $T_4$, $T_5$, and $T_6$, act collectively as an amplifier. The characteristics of this amplification are shown in FIG. 7. Capacitor $C_1$ is connected between ground and an input terminal. The gates of transistors $T_3$ and $T_4$ are electrically connected to the input terminal. Transistors $T_3$ and $T_4$ are connected drain to drain to one another, where a line is electrically connected to the gates of transistors $T_5$ and $T_6$. Transistors $T_5$ and $T_6$ are also connected drain to drain to one another, and the drain-drain connection is electrically connected to an output terminal. Transistors $T_3$ and $T_5$ are p-channel FETs, and have their sources connected to a positive voltage source and possibly a load, as indicated by the diagonal lines at the end of top of the lines feeding into the drains of transistors $T_3$ and $T_5$. Transistors $T_4$ and $T_6$ are n-channel FETs and have their sources connected to ground. The drains of transistors $T_5$ and $T_6$ are electrically connected to the output terminal and are also electrically connected to one end of a capacitor $C_2$. The other end of the capacitor $C_2$ is electrically connected to the gates of transistors $T_3$ and $T_4$. In an alternative embodiment, the voltage source is a negative voltage source, and transistors $T_3$ and $T_5$ are n-channel transistors having their sources connected to the sources of p-channel transistors $T_4$ and $T_6$.

Transistor $T_1$ has its drain electrically connected to the input terminal, one end of capacitor $C_1$ and the gates of transistors $T_3$ and $T_4$. Transistor $T_1$, has its gate electrically connected to the output terminal, to one end of capacitor $C_2$, and to the drain-drain connection of transistors $T_5$ and $T_6$. Transistor $T_2$ has its drain electrically connected to the source of transistor $T_1$, its gate electrically connected to an adjustable voltage source, labeled $V_2$, and its source connected to ground.

As indicated by the circles at the gates of transistors $T_3$ and $T_5$, transistors $T_3$ and $T_5$ are doped in a manner such that is the gate current is biased in the opposite direction as that of transistors $T_4$ and $T_6$ (e.g., if transistors $T_3$ and $T_5$, are n-channel FETs, then transistors $T_4$ and $T_6$ are p-channel FETs). Transistors $T_3$ and $T_5$ amplify one of the positive or negative part of the signal, while transistors $T_4$ and $T_6$ amplify the other part of the positive or negative part of the signal. As transistors $T_3$, $T_4$, $T_5$, and $T_6$ form an amplifier, and it is possible to form an amplifier even with just one transistor, whether or not all four transistors are used is optional.

Additionally, transistors $T_3$ and $T_4$ form a first stage of the amplifier, which inverts the polarity of the signal, while transistors $T_5$, and $T_6$ form a second stage of the amplifier, which inverts the polarity of the signal to its original polarity. By including two stages of amplification, the rise in voltage is also sharper than were there only one stage of amplification. The second stage of amplification inverts the signal without loosing signal strength.

Before the firing takes place, the initial voltage of the node, denoted as $V_{in}$ in FIG. 6, is low. As $V_{in}$ increases, the output voltage $V_{out}$ increases. As $V_{out}$ increases, $V_{out}$ pushes back through capacitor $C_2$, which causes $V_{in}$ to increase, which then causes $V_{out}$ to increase faster. Once this positive feedback loop starts, $V_{out}$ abruptly increases to $V_{max}$. The abrupt increase in $V_{out}$ from a low voltage (near or at ground) to a high voltage (near or at $V_{max}$), is a physical representation of the active element firing. In alternative embodiments, other types of positive feedback may be used instead of a capacitor $C_2$.

After the active element has fired, the voltage $V_{out}$ may be decreased rapidly so that a pulse is created. One way to create the end of the pulse, is to enable the charge on $C_2$ to drain away when the output, $V_{out}$ is high, via transistors $T_1$, and $T_2$. In particular, transistor $T_2$ helps determine the pulse width. Once, $V_{out}$ is high, the gate of transistor $T_1$ is pulled to its high setting, which opens the channel of transistor $T_1$. As a result, the current $I_r$ flows from the capacitor $C_1$ to ground lowering $V_{out}$. Transistors $T_1$ and $T_2$ may be n-channel or p-channel FETs depending upon whether voltage $V_{out}$ is negative or positive or may be other types of transistors. The threshold depends to at least some degree upon the capacitance of capacitors $C_1$ and $C_2$. If the capacitance of $C_1$ is increased then it takes more charge on $C_1$ for $V_{in}$ to reach the threshold voltage $V_L$. Referring to FIG. 7, if the voltage, denoted as $V_2$, on the gate of transistor $T_2$ is increased, then charge drains off the capacitor $C_1$ faster. Consequently, this decreases $V_{in}$ at a faster rate, so biasing the gate of transistor $T_2$ turns off the active element faster, and the bias on $T_2$ may be used to control the pulse width. Alternatively, another method of varying the pulse width may be used, such as by including a variable delay in the connection from $V_{out}$ to $T_1$.

Using transistors operating at subthreshold reduces the amount of power consumed by more than 5 orders of magnitude when compared to using transistors operating at or above threshold. In Carver Mead's words, for a transistor to operate subthreshold means: "The gate voltage at which the mobile charge [in the transistor] begins to limit the flow of current is called the threshold voltage . . . . Most circuits described in this book operate in subthreshold—their gate voltages are well below the threshold voltage," [MEAD]. Furthermore, when transistors operate subthreshold, the amount of heat produced is greatly reduced when compared to operating at or above threshold.

A machine of active elements may be implemented on a digital computer. However, the active element machine realizes far greater computational power when its machine instructions are directly implemented in suitable hardware. A good hardware implementation may enable the active element machine to execute computations more than four orders of magnitude faster than today's digital computers.

Other Extensions

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A system comprising:
   a multiplicity of artificially configured electronic computing elements; and
   a multiplicity of artificially configured electronic couplings communicatively connecting the multiplicity of computing elements to one another, such that the couplings are capable of transmitting messages between the multiplicity of artificially configured computing elements; and
   a group of the multiplicity of artificially configured computing elements receiving input including at least one instruction, which when executed causes at least one of the artificially configured computing elements to adjust one or more parameters, wherein each instruction specifies a computing element, a value, a time at which to assign the value, and a designation of whether to assign the value to the amplitude, the width, or the transmission time.

2. The system of claim 1, wherein
   a first portion of the multiplicity of artificially configured computing elements include at least the group of the multiplicity of artificially configured computing elements, which will be referred to as input elements, are capable of receiving the input for the system; and
   a second portion of the multiplicity of artificially configured computing elements, which will be referred to as output elements, each have a content that represents output of the system.

3. The system of claim 2, wherein the input elements are capable of being configured to send at least one message of the messages to others of the input elements.

4. The system of claim 2, wherein a third portion of the multiplicity of artificially configured computing elements, which will be referred to as computational elements, are capable of
   receiving at least a first message of the messages from the input elements, and
   sending at least a second message of the messages to the output elements.

5. The system of claim 4, wherein the computational elements are capable of sending at least the second message to at least one other of the computational elements.

6. The system of claim 1, wherein at least one computing element of the multiplicity of computing elements is associated with a period of time that must elapse after sending a first message prior to sending a second message, wherein the period of time that must elapse must be greater than zero, and will be referred to as a refractory period.

7. The system of claim 1, wherein at least one message of the messages is associated with an amplitude that is dependent on a first of the multiplicity of computing elements that is sending the at least one message and on a second of the multiplicity of computing elements of the computing elements that is receiving the at least one message.

8. The system of claim 7, wherein the system is configured such that the amplitude can be changed as a function of time while executing a sequence of instructions.

9. The system of claim 1, wherein at least one message of the messages is associated with a width that is dependent on a first of the multiplicity of computing elements that is sending the at least one message and a second of the multiplicity of computing elements that is receiving the at least one message.

10. The system of claim 9, wherein the system is configured such that the width can be changed as a function of time while executing a sequence of instructions.

11. The system of claim 1, wherein at least one message of the messages is associated with a transmission time that is dependent on a first of the multiplicity of computing elements that is sending the at least one message and a second of the multiplicity of computing elements that is receiving the at least one message.

12. The system of claim 11, wherein the system is configured such that the transmission time can be changed as a function of time while executing a sequence of instructions.

13. The system of claim 11, the multiplicity of couplings are configured in a manner, such that a graph of the machine includes one or more cycles.

14. The system of claim 11, the multiplicity of couplings and computational element are not layered.

15. The system of claim 1, wherein at least one computing element of the multiplicity of computing elements is associated with a time during which if a combination of amplitudes of messages received from other computing elements is less than a threshold, the at least one computing element sends a message.

16. The system of claim 15 wherein said combination is a sum.

17. The system of claim 15 wherein said combination is a convolution.

18. The system of claim 1, wherein at least one computing element of the multiplicity of computing elements is associated with a time during which if a combination of amplitudes of messages received from other computing elements is inside the range of a lower threshold and upper threshold, the at least one computing element sends a message.

19. The system of claim 18, wherein said combination is a sum.

20. The system of claim 1, wherein at least one computing element of the multiplicity of computing elements is associated with a time during which if a combination of amplitudes of messages received from other computing elements is outside the range of a lower threshold and upper threshold, the computing element sends a message.

21. The system of claim 20, wherein said combination is a sum.

22. The system of claim 1, wherein
each computing element of at least a group of the multiplicity of computing elements is associated with
a condition that causes the computing element to fire, and
a time at which the computing element fires will be denoted as a firing time, and
the system is configured to represent a symbol as a sequence of firing times.

23. The system of claim 1, wherein
each computing element of at least a group of the multiplicity of computing elements is associated with a condition that causes the computing element to fire, and a time at which the computing element fires will be denoted as a firing time, and
the system is configured to represent a sequence of one or more instructions as a sequence of one or more firing times.

24. A method of programming the system of claim 1 comprising:
configuring the system to produce a set of outputs in which each output of the set corresponds to a given input of a set of inputs.

25. A method of programming the system of claim 1 comprising:
choosing a set of instructions to produce a set of outputs in which each output of the set of outputs corresponds to a given input of a set of inputs.

26. A system comprising:
a multiplicity of electronic computing elements; and
a multiplicity of electronic couplings communicatively connecting the multiplicity of computing elements to one another, such that the couplings are capable of transmitting messages between the multiplicity of computing elements,
wherein at least two computing elements of the multiplicity of computing elements are associated with a period of time during which if a combination of amplitudes of received messages is greater than a threshold, a computing element of the at least two computing elements sends a message, wherein the received messages are those of the messages that were received from the at least two computing elements; and
wherein the system executes a sequence of instructions in which each instruction specifies a computing element, a value, a time at which to assign the value, and a designation of whether to assign the value to the amplitude, the width, or the transmission time.

27. The system of claim 26, wherein said combination is a sum.

28. The system of claim 26, wherein said combination is a product.

29. The system of claim 26, wherein said combination is a convolution.

30. The system of claim 26, the period of time being a first period of time wherein
at least one message of the messages is associated with a width, which is a length of time associated with the at least one message, that is dependent on a first of the multiplicity of computing elements that is sending the at least one message and a second of the multiplicity of computing elements that is receiving the at least one message;
at least one computing element of the multiplicity of computing element is associated with a second duration of time that must elapse after the at least one computing element last fired prior to the computing element firing again, wherein the duration of time that must elapse must be greater than zero, and will be referred to as a refractory period; and
the period of time starts at a time after the refractory period.

31. A system comprising:
a multiplicity of electronic computing elements; and
a multiplicity of electronic couplings communicatively connecting the multiplicity of computing elements to one another, such that the couplings are capable of transmitting messages between the multiplicity of computing elements,
wherein
at least one message of the messages is associated with an amplitude that is dependent on a sending computing element, which is a computing element of the multiplicity of computing elements that is sending the at least one message, and a receiving computing element, which is a computing element of the multiplicity of computing elements that is receiving the at least one message;
the system is configured such that the amplitude can be changed as a function of time while executing a sequence of instructions;
the at least one message is associated with a width that is dependent on the sending computing element and the receiving computing elements;
the system is configured such that the width can be changed as a function of time while executing a sequence of instructions;
the at least one message is associated with a transmission time that is dependent on the sending computing element and the receiving computing element;

the system is configured such that the transmission time can be changed as a function of time while executing a sequence of instructions; and the system executes a sequence of instructions in which each instruction specifies a computing element, a value, a time at which to assign the value, and a designation of whether to assign the value to the amplitude, the width, or the transmission time.

32. A system comprising:
a multiplicity of electronic computing elements; and
a multiplicity of electronic couplings communicatively connecting the multiplicity of computing elements to one another, such that the couplings are capable of transmitting messages between the multiplicity of computing elements
causing the system to execute a series of instructions in which each instruction is at least:
  a designation of a pair of communicatively coupled computing elements,
  a value,
  a time when to apply the value, and
  a designation as to whether the value is to be applied to a width, amplitude, or transmission time associated with a message sent between the pair of communicatively coupled computing elements.

33. A method comprising:
receiving a sequence of machine instructions, the machine instructions including explicit indications of times at which the instructions are to be implemented, each instruction specifying a computing element, a value, a time at which to assign the value, and a designation of whether to assign the value to the amplitude, the width, or the transmission time;
automatically electronically processing the machine instruction;
as a result of the processing, at the times indicated, causing a plurality of artificially configured electronic elements to send and receive messages,
wherein the messages travel along artificially configured electronic communication lines, and
wherein each communication line connects a pair of elements from the plurality of elements.

34. The method of claim 33, further comprising:
adjusting an amplitude associated with at least one of the messages, wherein the adjusting is performed as a function of time.

35. The method of claim 33, further comprising:
adjusting a width associated with at least one of the messages, wherein the adjusting is performed as a function of time.

36. The method of claim 33, further comprising:
adjusting a transmission time associated with a time that at least one of the messages travels between the pair of the elements, wherein the adjusting is performed as a function of time.

37. The method of claim 33, wherein each of the messages is associated with an amplitude, and a causing of a given element of the plurality of elements to send is performed by the given element if a combination of amplitudes associated with a set of messages received by the given element is above a threshold.

38. The method of claim 37, wherein the set of messages is received during a window of time.

39. The method of claim 38, wherein a message received outside of the window is not included in the combination.

40. The method of claim 38, wherein the window starts an amount of time after a prior sending of a message and ends after a time that is adequate for the message to travel a distance that is equal to a width associated with a particular message.

41. A system comprising:
an electronic active computing element sending and receiving messages;
the electronic active computing element being associated with a threshold, wherein if a combination of messages received is greater than the threshold for at least an instant during a finite window of time, the electronic active computing element sends a message of a finite width of time that is comparable to the finite window, and does not send messages at other times; and
the electronic active computing element also being associated with a refractory period, wherein after sending a first message, the electronic active computing element waits until after the refractory period passes prior to sending a second message,
wherein the system executes a sequence of instructions in which each instruction specifies a computing element, a value, a time at which to assign the value, and a designation of whether to assign the value to the amplitude, the width, or the transmission time.

42. The system of claim 41, wherein the electronic active computing element comprises:
an amplifier having an input and an output;
a positive feed from the output to the input; and
a switch for ending the positive feedback.

43. The system of claim 42, wherein the amplifier includes at least two stages, the first outputs an inverted signal, which is a signal that is inverted with respect to the input signal;
and the second stage inverts the inverted signal output of the first stage.

44. The system of claim 42, wherein the positive feedback includes at least a capacitor.

45. The system of claim 44, wherein the output controls a gate voltage of an field effect transistor that drains the capacitor.

46. The system of claim 41, wherein said combination is a sum.

47. A system comprising:
an electronic active computing element sending and receiving messages;
the electronic active computing element being associated with a threshold, wherein if a combination of messages received at some time is less than the threshold, the electronic active computing element sends a message; and
the electronic active computing element also being associated with a refractory period, wherein after sending a first message, the electronic active computing element waits until after the refractory period passes prior to sending a second message,
wherein the system executes a sequence of instructions in which each instruction specifies a computing element, a value, a time at which to assign the value, and a designation of whether to assign the value to the amplitude, the width, or the transmission time.

48. A system comprising:
an electronic active computing element sending and receiving messages;
the electronic active computing element being associated with a threshold interval, wherein if a combination of messages received at some time is outside the range of a lower threshold and upper threshold, the electronic active computing element sends a message; and the electronic active computing element also being associated with a refractory period, wherein after sending a first message, the electronic active computing element waits until after the refractory period passes prior to sending a second message, wherein the system executes a sequence of instructions in which each instruction specifies a computing element, a value, a time at which to assign the value, and a designation of whether to assign the value to the amplitude, the width, or the transmission time.

49. A system comprising:

an electronic active computing element sending and receiving messages;

the electronic active computing element being associated with a threshold interval, wherein if a combination of messages received at some time is inside the range of a lower threshold and upper threshold, the electronic active computing element sends a message; and the electronic active computing element also being associated with a refractory period, wherein after sending a first message, the electronic active computing element waits until after the refractory period passes prior to sending a second message, wherein the system executes a sequence of instructions in which each instruction specifies a computing element, a value, a time at which to assign the value, and a designation of whether to assign the value to the amplitude, the width, or the transmission time.

* * * * *